United States Patent [19]

Motoyama et al.

[11] Patent Number: 5,375,204
[45] Date of Patent: Dec. 20, 1994

[54] SYSTEM AND METHOD FOR EFFICIENT BINARY ENCODING OF PROCEDURES IN A DOCUMENT PROCESSING LANGUAGE

[75] Inventors: Tetsuro Motoyama; Donny Tsay, both of San Jose; Satwinder Mangat, San Mateo, all of Calif.

[73] Assignees: Ricoh Company, Ltd., Tokyo, Japan; Ricoh Corporation, San Jose, Calif.

[21] Appl. No.: 2,283

[22] Filed: Jan. 8, 1993

Related U.S. Application Data

[63] Continuation-in-part of Ser. No. 931,808, Aug. 11, 1992, which is a continuation-in-part of Ser. No. 876,601, Apr. 30, 1992, Pat. No. 5,319,748, and Ser. No. 876,251, Apr. 30, 1992, Pat. No. 5,325,484.

[51] Int. Cl.$^5$ ............................................. G06F 15/62
[52] U.S. Cl. ..................... 395/164; 395/101; 395/114; 395/115; 395/162; 382/56; 358/426; 341/51; 375/122
[58] Field of Search ............................. 395/114–116, 395/101, 162–166; 382/56; 358/426, 261.1, 261.2; 341/51, 67; 375/122

[56] References Cited

U.S. PATENT DOCUMENTS

| | | | |
|---|---|---|---|
| 4,464,650 | 8/1984 | Eastman et al. | 341/51 |
| 4,876,541 | 10/1989 | Storer | 341/51 |
| 5,027,376 | 6/1991 | Friedman et al. | 375/122 |
| 5,179,378 | 1/1993 | Ranganathan et al. | 341/51 |
| 5,243,341 | 9/1993 | Seroussi et al. | 341/51 |

OTHER PUBLICATIONS

"Adobe Writes a New Postscript" by Nick Baran, Byte, Aug. 1990.
"ISO/IEC DIS 10180, Information Processing-Text Communication-Standard Page Description Language", Mar., 1991.

*Primary Examiner*—Mark R. Powell
*Assistant Examiner*—Kee M. Tung
*Attorney, Agent, or Firm*—Oblon, Spivak, McClelland, Maier & Neustadt

[57] ABSTRACT

A system and method for converting a textual representation of nested procedures into a binary format where the binary format contains the length of each procedure at the beginning of the procedure. The system can be implemented using a single temporary storage buffer which is globally available to each procedure and procedures nested within. The first clear text procedure of a group of nested procedures causes the temporary storage buffer to be created. Memory locations are reserved in the temporary storage buffer for storing the length of the procedure, and then the procedure is converted to binary format which is then appended to the end of the buffer after the space reserved for the length of the procedure. Procedures which are nested within the first procedure also have space reserved in the buffer for length information and the binary representations of the nested procedures are appended onto the end of the buffer. When a procedure ends, the length of the procedure is calculated and written into the space previously reserved for length information. The single memory buffer can be considered a logically contiguous memory buffer. Other logically contiguous memory buffers include multiple memory buffers which can be kept track of using an array index of a double linked list data structure.

28 Claims, 15 Drawing Sheets

FIG. 7

CLEAR TEXT REPRESENTATION

11 ADD { 1 ADD } { 1 ADD }}

FIG. 8A

| STEP | TOKENSEQUENCE_BUFFER |
|---|---|
| A) | 90H 01H 90H 01H 31H |
| . . . | |
| G) | 90H 01H 90H 01H 31H 67H 00H 09H 90H 01H 31H 67H 00H 03H 90H 01H 31H |

FIG. 8B

| STEP | PROC_BUFFER | PROC_FLAG | NEXT | POSITION_STACK |
|---|---|---|---|---|
| A) | | 0 | 2 | 2 |
| B) | 67H 00H 00H | 1 | 3 | 1 |
| C) | 67H 00H 00H 90H 01H 31H | 1 | 6 | 1 |
| D) | 67H 00H 00H 90H 01H 31H 67H 00H 00H | 2 | 9 | 7/1 |
| E) | 67H 00H 00H 90H 01H 31H 67H 00H 00H 90H 01H 31H | 2 | 12 | 7/1 |
| F) | 67H 00H 00H 90H 01H 31H 67H 00H 03H 90H 01H 31H | 1 | 12 | 1 |
| G) | 67H 00H 09H 90H 01H 31H 67H 00H 03H 90H 01H 31H | 0 | 12 | 2 |

POSITION = j
DOUBLE LINK LIST DATA STRUCTURE

SYSTEM AND METHOD FOR EFFICIENT BINARY ENCODING OF PROCEDURES IN A DOCUMENT PROCESSING LANGUAGE

CROSS-REFERENCES TO RELATED APPLICATIONS

This application is a continuation-in-part of U.S. patent application Ser. No. 07/931,808 filed on Aug. 11, 1992 and entitled "A Method And System to Handle Dictionary Generation and Context Declaration in a Document Processing Language" which is a continuation-in-part of U.S. patent application Ser. Nos., 07/876,601 now U.S. Pat. No. 5,319,748 and 07/876,251 now U.S. Pat. No. 5,325,484 both filed on Apr. 30, 1992 and entitled "Method and Apparatus to Manage Picture and Pageset for Document Processing" and "Method and System to Handle Inclusion of External Files into a Document Processing Language," respectively.

BACKGROUND OF THE INVENTION

1. Field of the Invention

This invention relates generally to the control of a printer and to the compression and encoding of information sent to a printer. In this context, a printer is not only envisaged as a conventional computer printer but also as a remote fax printer or other types of display or presentation devices. This invention also relates to binary encoding of a computer language, and more particularly, to a system and method for efficient binary encoding of nested procedures in which the binary representation contains a field pertaining to the length of the procedure.

2. Discussion of the Background

A large amount of information is sent every day to printers throughout the world. It is often desired to have information printed faster and ready for use sooner in today's hectic office environments. Data compression systems are known in the prior art that encode a stream of digital data signals into compressed digital code signals and decode the compressed digital code signals back into the original data. The object of data compression systems is to effect a savings in the amount of storage required to hold or the amount of time required to transmit a given body of digital information. By decreasing the required memory for data storage or the required time for data transmission, compression results in a monetary savings. If tapes or disks are utilized to store data files, then fewer tapes or disks are required for storing compressed files. If telephone lines or satellite links are utilized for transmitting digital information, lower costs result when the data is compressed before transmission as a smaller amount of transmission time is required.

For example, it may be desired to transmit the contents of a daily newspaper or weekly newsletter via satellite link or telephone line to a remote location for printing. Appropriate devices may convert the contents of the newspaper and newsletter into a data stream of characters for transmission via the communication link. If the symbols comprising the contents of the newspaper or newsletter were compressed before transmission and reconstituted at the receiver, a significant amount of transmission time is saved.

As a further example, when an extensive collection of documents such as word processing data files on a network file server of a large corporation are stored for archival purposes, a significant amount of storage space would be saved if the totality of symbol signals comprising the documents were compressed prior to storage and reexpanded from the stored compressed files for later use.

A fundamental requirement for compression of digital data is that the compression system must be reversible. That is, it must be possible to reexpand or decode the compressed data back into its original form without any alteration or loss of information. The decoded and the original data must be identical and indistinguishable with respect to each other.

One of the best known and most widely used general purpose data compression procedures is the Lempel, Ziv et al system, hereinafter the "LZ" system and disclosed in U.S. Pat. No. 4,464,650. The LZ system is a lossless, dynamic, on-line system for compression of textual data. The LZ system involves storing frequently-appearing string of characters in memory. A pointer to the stored string of characters is transmitted in place of the full string when a new string of characters appears in the input string that matches the stored stream of characters. When a string of characters appears in the input stream that matches a stored string of characters, but also includes a string of one or more characters, the pointer for the matched string is transmitted along with the first character of the new string of characters, with the first character being transmitted in uncompressed form.

However, a problem with the LZ data compression system is that the technique typically requires large amounts of computer memory and processing time. Additionally, once the memory which stores the strings of characters which are often repeated is full, the Lempel and Ziv method has difficulty in dynamically changing the repeated strings of characters.

Storer discloses in U.S. Pat. No. 4,876,541 a data compression system which overcomes the problems in the Lempel et al patent and enables updating of frequently appearing strings of characters which are compressed. In Storer's data compression system, both the encoder and decoder have dictionaries for storing frequently appearing strings of characters. Each string is identified by a unique pointer. The input data string is parsed and matched with strings in the encoder dictionary using a matching algorithm. The pointer associated with the matched string is then transmitted to a remote location for storage or decoding. Thereafter, using the update algorithm, the encoder dictionary is updated to include new strings of data based on the matched string of data.

An alternative form of data compression is set forth in U.S. Pat. No. 5,027,376 by Friedman et al and assigned to Microcom Systems, Inc. Friedman's compression system is used in MNP (Microm Networking Protocol) modems. In Friedman's systems, the compressing modem receives an input data stream and each character in the data stream is recodified with a compressed character code, the length of which is dependent on the frequency of the characters in the data stream. A frequency table is maintained so that changes in the relative frequency of characters in the data stream will be recognized by the compressing modem and the compressed characters representing such characters will be exchanged accordingly. A decompressing modem, connected over communication lines to the compressing modem, processes the compressed character code in a reverse order from the manner in which the compressing modem processes the codes. The decompressing modem also has a relative frequency table and as the relative frequencies of the various characters change, the actual characters represented by the compression codes must also be changed. While the above described data compression systems may be very efficient in compressing data for transmission or storage, they suffer from several drawbacks. First, the compressed files are stored in a format which is not directly readable. That is, the files must be decompressed before being used for any purpose. This decompression of the information requires processor time so that the compressed information can be returned to its original form. Second, as the data is being compressed, a large amount of memory is often required to store frequently used character strings stored as codes in the compressed file.

Data compression routines are particularly useful for word processing files. One way in which a data processing file can be stored is in a page description language which contains information of the text of the file and formatting commands. Page description languages (PDLs) are currently used to control the operation of computer printers and are ideally suited for printing documents containing both text and graphics. Examples of PDLs are Postscript ® from Adobe Systems, Inc., and Interpress ® from Xerox. The present invention is discussed with regard to the Standard Page Description Language (SPDL) which is currently a proposal in draft form before a section of the International Standards Organization ("ISO") as ISO/IEC DIS 10180 and is available through the American National Standards Institute ("ANSI") in New York.

A document in SPDL is a final form of the document. That is, the document has been created, edited, and all composition, formatting and positioning decisions pertaining to the document have been made. An SPDL document is ready for presentation by a presentation device such as a printer or computer monitor which displays the final form of the document. An SPDL document can also be transmitted to another computer or to a facsimile device over a communications link.

There are two primary parts to an SPDL document; structure and content. The structure of a document is independent of its content. However, the structure of a document establishes the context of interpretation for the content. For example, if bold face is available, the context of interpretation would indicate that a bold face typeface is in the available resources but the text itself would be the content. Examples of structure elements are documents, pictures, dictionary generators and tokensequences, as set forth in co-pending U.S. patent application Ser. No. 07/876,601 now U.S. Pat. No. 5,319,748. A tokensequence is a special type of structure element which contains document content. SPDL uses Abstract Syntax Notation 1 (ASN.1), as defined in ISO 8824:1990 and ISO 8825:1990, both of which are incorporated herein by reference, for binary structure encoding which defines tokensequences as Octet Strings which are a sequence of 8 bit bytes. Standard Generalized Markup Language ("SGML"), as defined in ISO 8879:1986 is used for the clear text structure encoding.

An SPDL document can be represented in two types of formats; a clear text format and a binary format. The clear text format represents a document using human readable form which can be understood by one familiar with the SPDL page description language. The binary SPDL format, on the other hand, represents a document using a binary machine readable form. A drawback of binary encoding is that it cannot be read by a human. Therefore, if there is an error in the binary encoding of an SPDL file, the error cannot be easily corrected. For example, if a document is transmitted to another system and subsequently cannot be printed, a user of the system which receive the document would not be able to correct the binary form of the document. While clear text SPDL files may be readable by both a human and a computer, clear text SPDL files require a large amount of physical storage space, are slow to be transmitted over communication lines, and require a large amount of processing time to print. However, a clear text SPDL file and a binary SPDL file are fully equivalent. That is to say any functionality that can be expressed in one can be expressed in the other with a syntactic transformation. SPDL files use different encoding schemes than Interpress and PostScript. Interpress uses only binary encoded files and these files are not equivalent to binary SPDL files. PostScript originally used only a clear text representation but now supports both clear text and binary encodings. However the clear text and binary encodings of PostScript are different than the clear text and binary encodings of SPDL.

Clear text SPDL documents can contain procedures represented by information between a "{"and"}". When a procedure is represented in the binary format, the beginning of the procedure is represented by 67H, for example, followed by a two byte representation of the number of bytes required to represent the procedure, e.g., 00H 08H to represent the procedure as being 8 bytes long, followed by a binary representation of the procedure. As a clear text procedure is being converted to a binary representation, each clear text operand or instruction is written into a storage buffer as that operand or instruction is being converted to binary. When the entire text routine has been converted to binary and written into the storage buffer, 67H is written into the binary SPDL file followed by a two byte field for the number of bytes required to represent the routine, followed by the contents of the storage buffer which contains the binary representation of the clear text routine. Therefore, before a clear text procedure can be written into a binary representation, it is necessary to know the number of bytes in the binary representation of the procedure. A major problem results in that a buffer to store the binary representation of a procedure is needed for each procedure and many nested procedures require the use of many buffers which can result in memory management problems.

An explanation of how the clear text nested procedures "{1 add {2 add {3 add}}}" is encoded into a binary representation according to a simple method follows. The above procedure is used so as to provide a simple and clear illustration of the operation and problems of a conventional method. When "{1 add" is encountered, a buffer is created which holds the binary representation of "1 add". When the second "{" is encountered, there is a nested procedure and a second buffer is created which holds the binary representation of "2 add". When the third "{" is encountered, a third buffer is created which holds the binary representation of "3 add".

When the first "}" is encountered, the third procedure containing "3 add" has ended. Then, 67H, followed by two bytes representing the length of the third buffer, followed by the contents of the third buffer are appended to the second buffer.

When the second "}" is encountered, the second nested routine which was converted to a binary format has ended. Then, 67H, followed by a two byte number of the length of the second routine (e.g., the length of the binary representation of "2 add" plus the length of the third routine) plus the contents of the second buffer are appended to the first buffer. A similar procedure occurs for the third "}" and the encoded nested procedures are written into a file or other storage location.

This conventional method is an inefficient use of memory in that multiple unfilled buffers are needed. Further, these multiple buffers must be managed especially when there are a plurality of nested routines.

SUMMARY OF THE INVENTION

It is therefore an object of this invention to provide a representation of a clear text SPDL file which allows the file to be compressed into a binary form so that it may be stored using smaller space and transmitted using less time, yet still be prepared for printing at a faster rate.

It is another object of this invention to provide an efficient system for binary encoding nested procedures where the binary representations of the procedures contains a length field.

It is yet another object of this invention to provide an efficient method and apparatus which can encode nested procedures into a binary format using a minimum number of temporary storage buffers.

These and other objects are achieved according to the present invention by providing an efficient method and apparatus according to a first embodiment for encoding nested procedures of a clear text format into a binary format using only one buffer to temporarily store the encoded binary procedures.

When procedures are encoded from a clear text to a binary format using the present invention, the beginning of a first procedure causes the creation of a storage buffer in which 67H 00H 00H is written. The 67H signifies the beginning of the procedure and the 00H 00H reserves space in which the length of the binary representation of the procedure will later be written. The binary representation of the procedure is written in the buffer after the 67H 00H 00H. If there is a second or subsequent procedures after the first procedure, 67H, 00H 00H is written at the end of the buffer followed by the binary representation of that procedure. A similar process happens for the beginning of each subsequent procedure.

When a "}" is encountered, signifying the end of a procedure, the length of the last procedure being processed is calculated and written over the 00H 00H reserved for that procedure. A similar process happens for each subsequent procedure end.

Second and third embodiments of the invention operate in a somewhat similar manner to that of the first embodiment of the invention. These embodiments do not allocate as much memory for a temporary memory buffer as the first embodiment of the invention. When the memory buffer becomes full in the second and third embodiments, additional memory buffers are allocated as needed to store additional information. However, the use of multiple memory buffers in the second and third embodiments of the invention are different from the use of multiple buffers as is done in the prior art and previously described because the multiple temporary storage buffers are logically contiguous. This means that the beginning of a subsequent memory buffer contains information which would not fit into a previous memory buffer. Therefore, even though multiple buffers are used, they should be viewed as a whole as one logically contiguous memory buffer.

The second embodiment of the invention assigns array indexes to the multiple storage buffers and keeps track of the multiple buffers using the array indexes.

The third embodiment of the invention uses double linked list data structures to keep track of the multiple storage buffers. The double linked list data structures have a pointer to a previous data structure and a pointer to a next data structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is an example of a simple tokensequence in clear text format;

FIG. 8A and 8B are illustrations of the variables used to encode the clear text representation illustrated in FIG. 7 into binary format according to the first embodiment of the invention.

DESCRIPTION OF THE PREFERRED EMBODIMENTS

Figure 1:
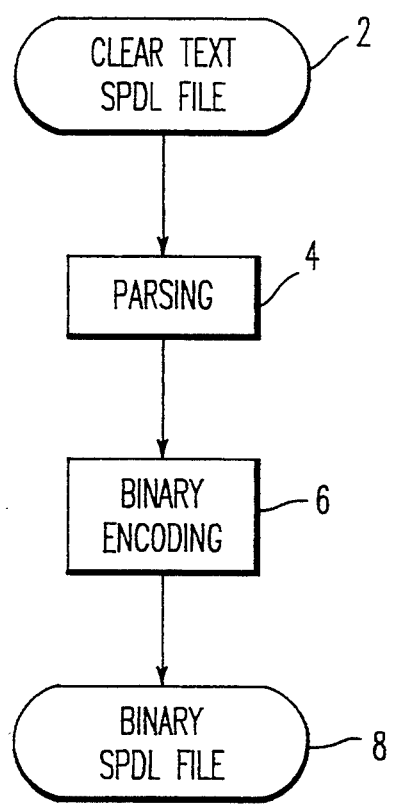
FIG. 1 is a simplified flowchart of a process for encoding a clear text SPDL file into a binary SPDL file.

Referring now to the drawings, wherein like reference numerals designate identical or corresponding parts throughout the several views, and more particularly to the binary encoding process illustrated in FIG. 1 in which a clear text SPDL file 2 is converted to a binary SPDL file 8, the clear text SPDL file 2 is typically generated by a word processor or graphics program, for example. Encoding a clear text SPDL file to a binary form compresses the file to about 30% or more of its original size which reduces the space necessary to store the file by about 30% or more. The present inventors have found that the size of a clear text file having a small amount of content as compared to the amount of structure can be reduced by 90% when converted to binary. The time necessary to transmit the file over communications lines to a printer or network is similarly reduced by 30% or more. Additionally, a binary SPDL file can be printed much faster than a clear text SPDL file. The binary SPDL file is printed faster because, for example, the clear text commands have been converted into the equivalent of a binary opcode which can be processed much faster than clear text commands. Also, there is no need to examine the binary SPDL file for end of procedure commands as the lengths of procedures are stated at the beginning of each procedure.

The present invention is not limited to translating a clear text SPDL file into a binary SPDL file but is also applicable to direct production of a binary SPDL file by an application program such as a word processing program or page description file generating program, for example. Therefore, it is not necessary for the processing program to first create a clear text SPDL file but the application program could encode a file directly into a binary SPDL format. Further, recitation of the generation of procedures which are later encoded encompasses placing or reading into memory, any type of data to be encoded, including data read from a previously created file which could be a previously created clear text SPDL file, for example, which is to be converted to a binary SPDL file, for example.

The single buffer of the first embodiment of the present invention also allows the use of less resources for memory management as compared to multiple buffer methods and the problem of memory fragmentation which can result when multiple buffers are used will not result when there is one memory buffer.

While the processes and examples described herein will describe an encoding into a binary representation, an important feature of the invention is the physical transformation performed by this invention. The physical representation of clear text data in a memory is larger than the physical representation of the equivalent information in binary form. When data is represented in a memory such as a disk, it is stored as magnetic aberrations of zeros and ones on the disk. Therefore, the converted representation of the file requires less magnetic material on the disk to represent the same information. Alternatively, if the data is stored in a RAM, it is stored not magnetically but electrically. Therefore, the binary representation requires less electrical signals which are stored in fewer memory locations.

The first processing step illustrated in FIG. 1 is the parsing step 4. The parsing step separates the components of the clear text SPDL file into basic units such as structure elements or content which can then be translated into machine instructions by a binary encoding step 6. Conventional types of parsing are easily implemented, either in software or in hardware, and no explicit details of the parsing are made herein for the sake of brevity.

Next, the parsed basic units from step 4 are encoded into a binary format in step 6 and stored in binary SPDL file 8. The process of the binary encoding is the step which the present invention is directed toward and a detailed description of the binary encoding process will be described after a description of the hardware used to implement the process of the present invention. As previously stated, it is also possible to encode a file into a binary representation without first encoding the file into a clear text format.

Figure 2:
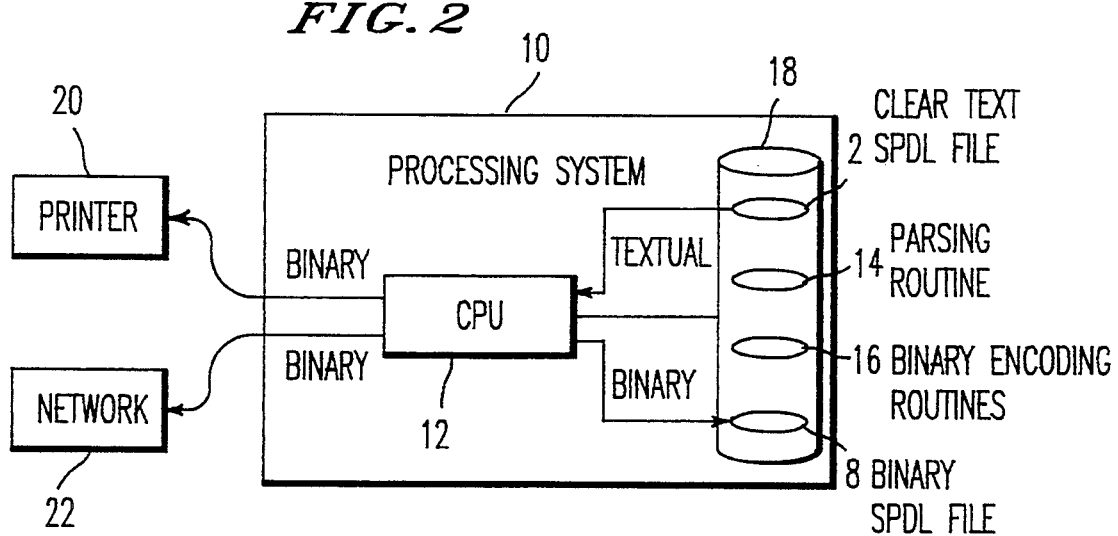
FIG. 2 is a block diagram of a system implementing the present invention.

FIG. 2 illustrates a block diagram of an apparatus constructed in accordance with the invention. The clear text SPDL file 2 from a storage device 18, such as a hard disk, is transmitted to a CPU 12 in a processing system 10. CPU 12 uses a parsing routine 14 and binary encoding routines 16 to perform the parsing step 4 and binary encoding step 6 of the process illustrated in FIG. 1 to encode the clear text SPDL file 2 to the binary SPDL file 8. The binary SPDL file 8 can be transmitted back to storage device 18 for archive purposes as a binary SPDL file 8, to a printer 20, or to other devices in a network 22.

Figure 3:
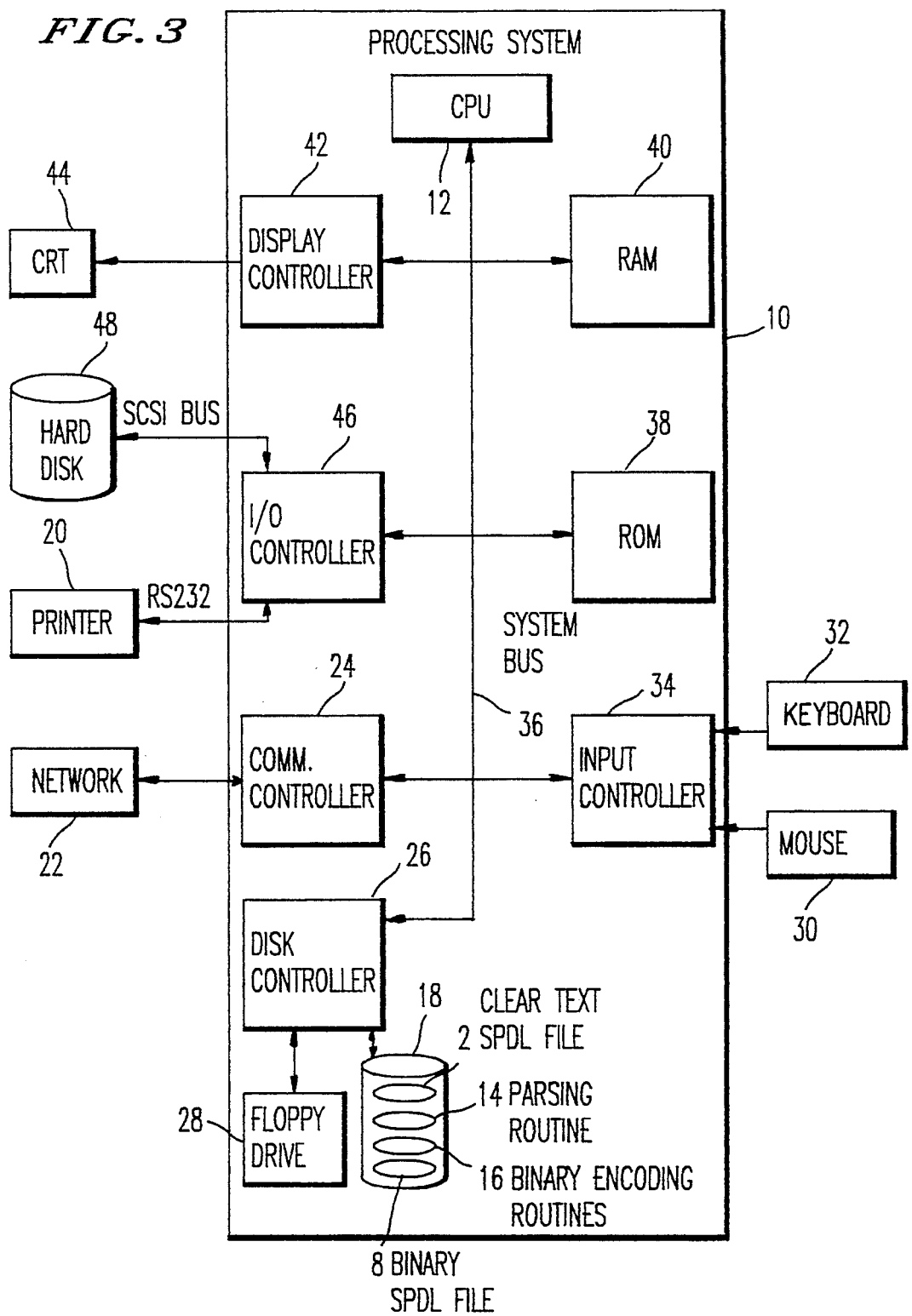
FIG. 3 is a more detailed illustration of the system of FIG. 2.

FIG. 3 is a more detailed diagram of the processing system 10 of FIG. 2 and the peripherals connected thereto. Storage device 18 stores the clear text SPDL file 2 which is transmitted to a RAM 40 using a disk controller 26 and a system bus 36. CPU 12 is used to parse and encode, using the parsing routine 14 and binary encoding routines 16 stored in hard disk 18, the clear text SPDL file which is stored in RAM 40. Alternatively, the parsing routine and/or the binary encoding routines can be stored in ROM 38. From RAM 40, the encoded binary file can be stored or archived in storage device 18 which is for example, a hard disk, as the binary SPDL file 8, in a floppy drive 28 connected to a disk controller 26 or in a second hard disk 48 connected to an I/O controller 46 through an SCSI bus. Alternatively, the file could be printed using printer 20 connected to an I/O controller 46 using, for example, an RS232 line, or sent over a network 22 such as a conventional Ethernet ® network using a communication controller 24. Information may be displayed on a CRT 44 which is sent from a display controller 42. The Processing System 10 is controlled by a user through, for example, a keyboard 32 or a mouse 30, both of which may be connected to an input controller 34. A ROM 38 is used to store various routines required by CPU 12.

Figure 4:
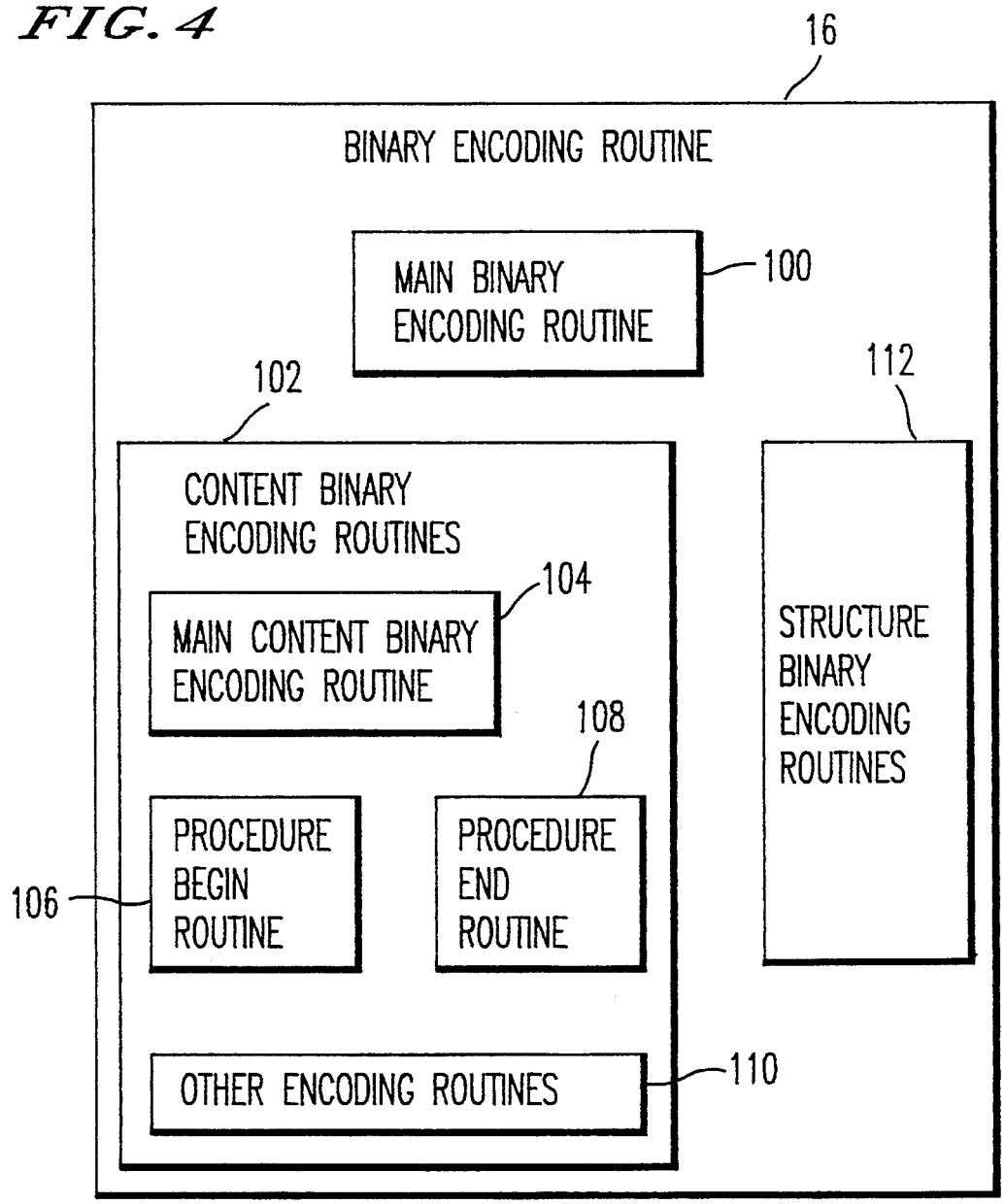
FIG. 4 is a block diagram of the binary encoding routines used by the invention.

FIG. 4 illustrates the various routines in the binary encoding routine 16. When encoding of a clear text SPDL file begins, a main binary encoding routine 100 is executed. The main binary encoding routine 100 determines whether content or structure is being encoded and calls either the main content binary encoding routine 104 or structure binary encoding routines 112. The structure binary encoding routines 112 determine the type of structure which is to be encoded in binary format so that a proper context of interpretation of content can be performed. Examples of various structures used in SPDL language are pictures, pagesets, prologues, and dictionary generators. The structure defines various available components such as initial state variables and dictionaries used when interpreting content. A more complete description of the various types of structures is not necessary for an understanding of the present invention but can be found in commonly assigned copending U.S. patent application Ser. Nos. 07/778,578, filed on Oct. 17, 1991, 07/876,251 now U.S. Pat. No. 5,325,484, filed on Apr. 30, 1992, 07/876,601 now U.S. Pat. No. 5,319,748, filed on Apr. 30, 1992, and 07/931,808, filed on Aug. 11, 1992.

Once the structure is determined by structure binary encoding routines 112, content binary encoding routines 102 can translate the clear text representation of various tokens from a textual format to a binary format. When the procedures are encoded into this binary format, it is necessary to have the length of a procedure (i.e., the number of bytes) stated at the beginning of the procedure. A tokensequence, the special structure element which contains content, can include one or more procedures and it is possible to have one or more nested procedures within a procedure. That is, a procedure can have within it one or more additional procedures. It is also possible to have a tokensequence which does not contain any nested procedures. A tokensequence might contain only one operation, for example. A procedure begin routine 106 and a procedure end routine 108 keep track of the nesting of the procedures in addition to keeping track of the beginning and ending of a procedure within a tokensequence. The other encoding routines 110 handle encoding of the content of the tokensequence. A main content binary encoding routine 104 determines if there is a procedure begin, procedure content, or a procedure end and calls the procedure begin routine 106, other encoding routines 110, or procedure end routine 108 depending on what content is encountered.

The routines of FIG. 4 have been separately illustrated for simplicity. However, it is possible to combine two or more routines into one routine. For example, it is possible to have the main binary encoding routine 100 and structure binary encoding routines 110 as one routine. It is also possible to have the parsing function performed by the main binary encoding routine 100 or structure encoding routine 112. While a simplified embodiment of the invention has all binary encoding routines performed by CPU 12, it is possible to have a separate structure processor for structure binary encoding routines 112 and a separate content processor for content binary encoding routines 102 to increase execution speed.

Figure 5:
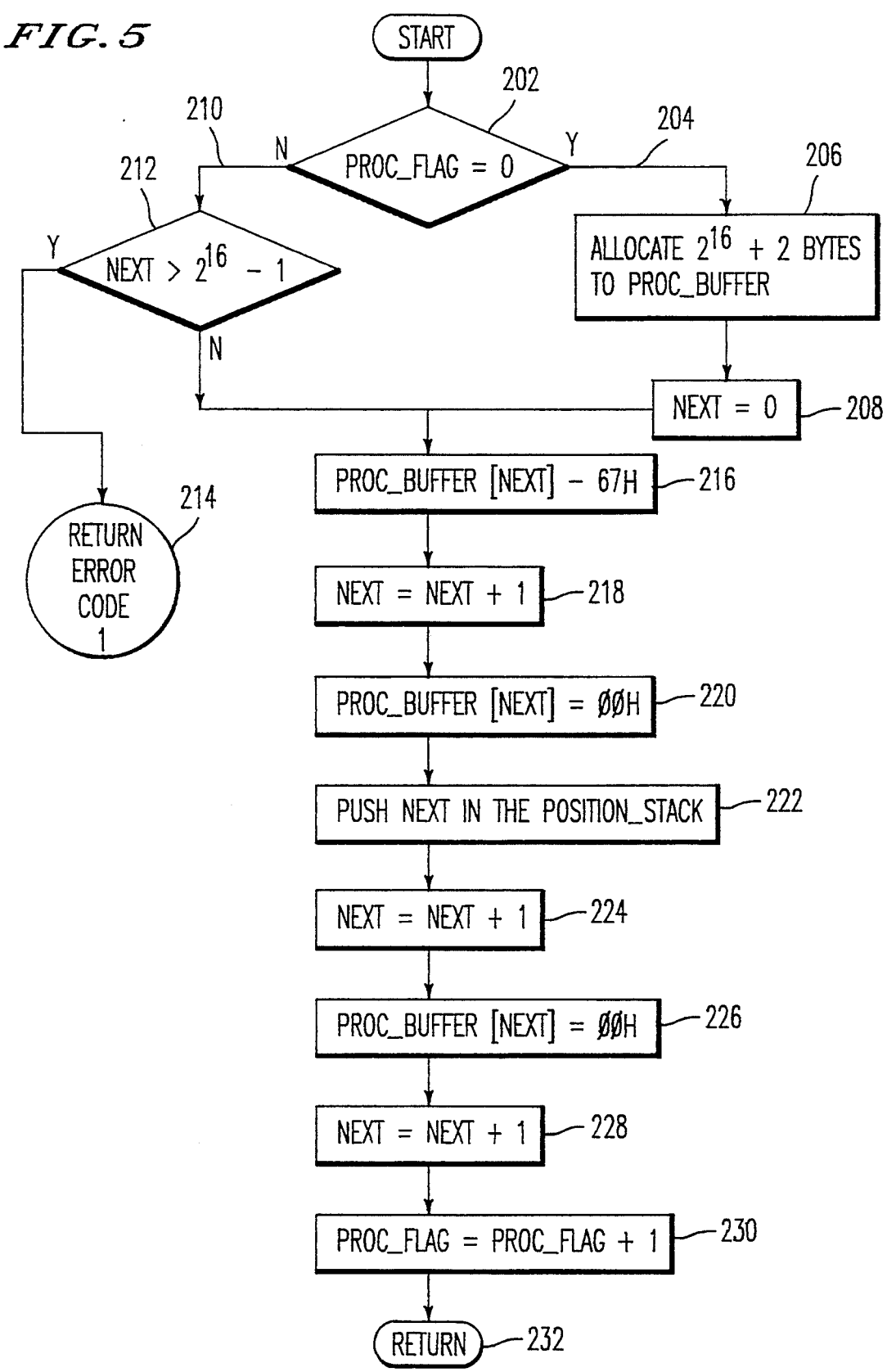
FIG. 5 is a flowchart illustrating the process of the procedure begin routine used by the first embodiment of the invention.
Figure 6:
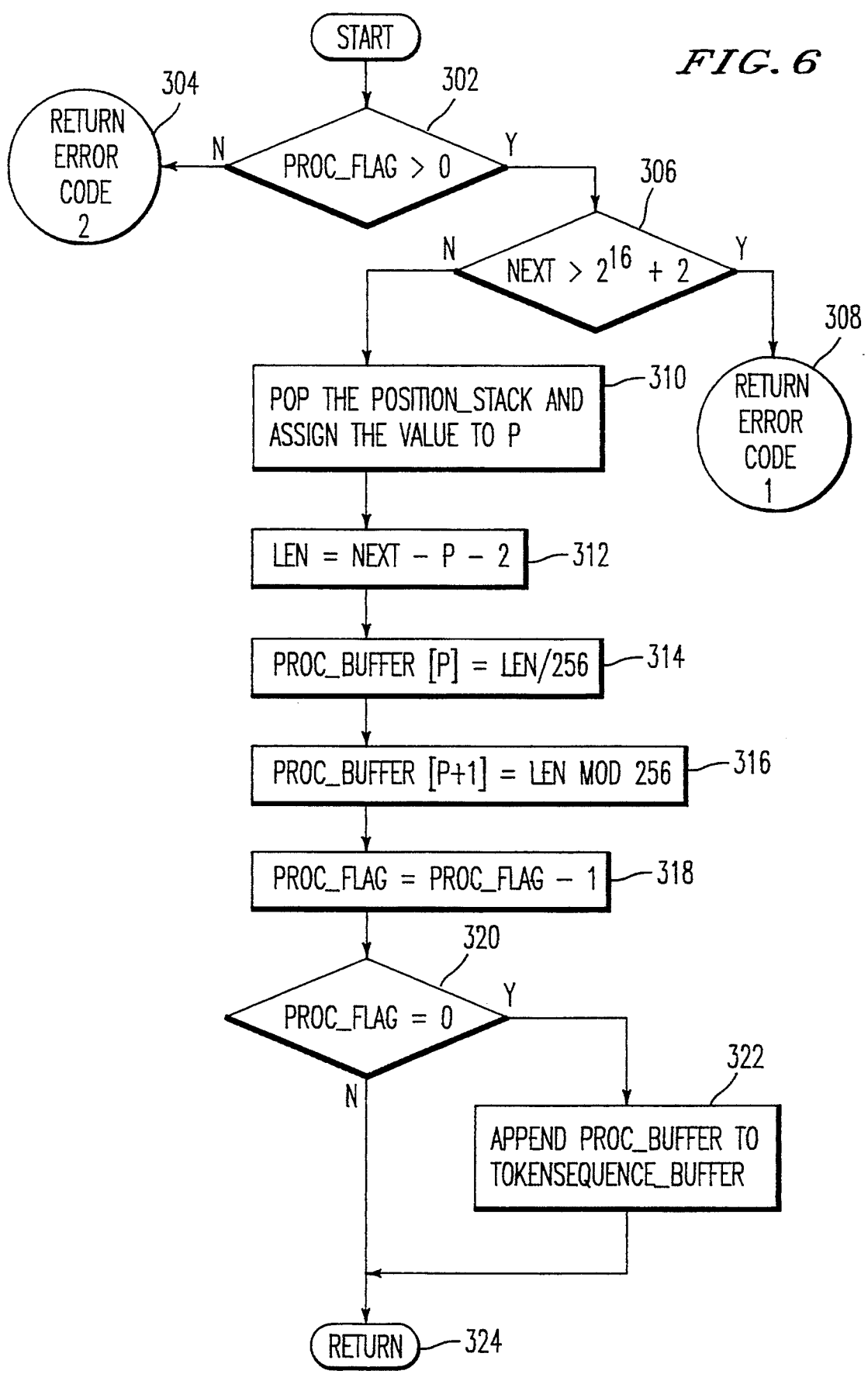
FIG. 6 is a flowchart illustrating the process of the procedure end routine used by the first embodiment of the invention.

The illustrated procedure begin routine of FIG. 5 and procedure end routine of FIG. 6 perform binary encoding of content according to the first embodiment of the invention using one buffer, PROC_BUFFER, one stack, POSITION_STACK, and variables PROC_FLAG used to keep track of the number of nested procedures, and NEXT, used to keep track of the position in PROC_BUFFER. PROC_BUFFER can be, for example, a single physically continuous memory buffer (i.e. occupies physically adjacent locations in memory), or a memory buffer having sequential addresses (i.e. the addresses of each location in the buffer sequentially follows addresses of previous locations). It is also possible that the memory buffer comprise a logically contiguous memory buffer which has multiple memory buffers. These are kept track of by the use of indexes or a linked list data structure, as will be explained in detail with respect to the second and third embodiments of this invention.

The procedure begin routine 106, illustrated in the flowchart of FIG. 5, is called by the main content binary encoding routine 104 when the beginning of a procedure, represented by the character "{", for example, is detected. The first step 202 of the procedure begin routine examines to see if the variable PROC_FLAG is equal to 0. If PROC_FLAG is equal to 0, this routine is not within another procedure but is a first routine to be encoded. Flow proceeds along line 204 to step 206 where $2^{16}+2$ bytes of memory are allocated for the PROC_BUFFER. Step 208 then initializes the variable NEXT, which keeps track of the position in the PROC_BUFFER, as 0.

If in step 202, PROC_FLAG is not equal to 0, this is a nested procedure and PROC_BUFFER already exists. Flow proceeds along line 210 to step 212 where the value of NEXT is examined to determine if PROC_BUFFER has at least three available bytes for this procedure by examining if NEXT is greater than $2^{16}-1$. If it does not, flow proceeds to step 214 which returns an error code 1, indicating there is not enough space left in the PROC_BUFFER to encode the present routine. The third embodiment, described later in detail, uses a double linked list to manage the PROC_BUFFER rather than to terminate here and the second embodiment uses an array index to manage PROC_BUFFER. In these alternate embodiments, new buffers will be allocated and variables will be adjusted accordingly. If there is enough space, flow proceeds to step 216.

Step 216 loads the NEXT position of PROC_BUFFER with the value 67H which denotes the beginning of a procedure. Step 218 increments NEXT by one and step 220 then loads 00H into PROC_BUFFER(NEXT). The value of NEXT is then pushed into the POSITION_STACK in step 222. By pushing NEXT onto the POSITION_STACK, the position in the PROC_BUFFER where the length of the nested procedure will eventually be written is stored.

Step 224 increments NEXT by 1 and step 226 loads PROC_BUFFER(NEXT) with 00H. The loading of PROC_BUFFER with 00H in steps 220 and 226 reserves the space where the length of the procedure will eventually be written. A "00H, 00H" is written into the buffer to reserve two bytes for the length of the procedure. This allows for a length of a procedure and procedures nested therein to be up to 64K bytes in length. More than two bytes can be used if necessary and the two bytes representation is only illustrative. Step 228 increments NEXT by 1 so that information written into PROC_BUFFER will be written into an empty position. Step 230 increments PROC_FLAG by 1, indicating that the nested level is increased by 1, and flow returns to the main content binary encoding routine 104.

As content of the information is being processed by the other encoding routines 110 after the procedure begin routine 106 is completed, the binary representation of the content is written into PROC_BUFFER with NEXT being incremented by 1 for each byte written into PROC_BUFFER. As the content of the current procedure is being processed by the other encoding routines 110, it is possible that a procedure will be nested within this procedure, or that the procedure will be terminated. If the beginning of another procedure is detected, the procedure begin routine 106 illustrated in FIG. 5 is called again. If the end of a procedure is detected, the procedure end routine 108 of FIG. 6 will be called by main content binary encoding routine 104.

The first step of the procedure end routine 108, illustrated in the process of FIG. 6 is determining whether PROC_FLAG is greater than 0 in step 302. If PROC_FLAG is not greater than 0, an error has occurred as the end of a procedure has been detected without there being a beginning of a procedure. Accordingly, flow proceeds to step 304 where error code 2 is returned. If PROC_FLAG is greater than 0, the flow proceeds to step 306 where the value of NEXT is examined to determine if a buffer overflow has occurred. If NEXT is greater than the buffer size, the routine returns with error code 1 at step 308. If the buffer has not overflowed, flow proceeds to step 310 where the top value in the position stack is popped and temporarily stored in the variable P. Step 312 determines the length of the procedure which has just ended by taking the next position in the buffer, NEXT, and subtracting P which is the number in the stack representing the position of the beginning of the current routine and then 2 is subtracted from this value as there are two characters in PROC_BUFFER to store the position length.

Steps 314 and 316 insert the length of the procedure into the length field of the PROC_FLAG. Step 314 has the effect of stripping the least two significant bytes from the value LEN and writing the two most significant bytes in position P of PROC_BUFFER. Step 316 puts the least two significant bytes into the P+1 position of the PROC_BUFFER. Then, step 318 decrements PROC_FLAG by 1 as there is now one less nested procedure. If PROC_FLAG is determined to be 0 in step 320, there are no more nested procedures and therefore the contents of the PROC_BUFFER can be appended to the TOKENSEQUENCE_BUFFER in step 322. The TOKENSEQUENCE_BUFFER is a buffer which contains the binary encoding of a tokensequence structure element, which is the content portion of SPDL. As only the first NEXT bytes of PROC_BUFFER contain the binary encoded procedures, only those bytes need be appended to the TOKENSEQUENCE_BUFFER. An example of pseudocode which would perform this appending is: TOKENSEQUENCE_BUFFER=PROC_BUFFER[i], i=0 to NEXT −1. The TOKENSEQUENCE_BUFFER can be in any type of memory including random access memory or a disk, for example. The procedure end routine is complete and flow then returns to the main content binary encoding routine 104 at step 324.

The following is an example of translating a clear text representation of a tokensequence into a binary representation. FIG. 7 illustrates a clear text representation of the tokensequence 1 1 ADD {1 ADD {1 ADD}}. While the tokensequence illustrated contains only simple mathematical formulas for simplicity purposes, the present invention is also applicable to more complex nested routines. Also, it is not necessary for the procedures to be first encoded into a clear text format but a page description generating device or application program can directly encode procedures into the binary encoding scheme. In step A of the binary encoding, "1 1 add" is translated into binary format and placed in the TOKENSEQUENCE_BUFFER as illustrated in step A of FIG. 8A. The TOKENSEQUENCE_BUFFER holds the output of the content binary encoding routines 102 and can be a part of binary SPDL file 8 of FIGS. 1, 2, and 3.

The first "}" indicates the beginning of a procedure and the main content encoding routine 104 calls the procedure begin routine 106 illustrated in FIG. 5. When the procedure begin routine is called, and as this is the first routine, PROC_FLAG is 0, memory for the PROC_BUFFER is allocated and NEXT is set equal to 0. 67H is then placed in the 0 position of PROC_BUFFER and 00H is inserted at positions 1 and 2 of PROC_BUFFER. As the first length field, reserved as 00H, is at position 1 in the PROC_BUFFER, 1 has been pushed onto the POSITION_STACK. Therefore, at the end of step B, PROC_FLAG is 1 as the first routine is being processed, and NEXT is equal to 3 as the NEXT position where data will be placed in PROC_BUFFER is 3.

When the characters "1 add" are encountered and other binary encoding routines 110 are called which translate "1 add" as 90H 01H 31H in positions 3, 4 and 5 of the PROC_BUFFER. As three positions have been written in the PROC_BUFFER, NEXT is incremented by 3 to 6. A procedure has not begun or ended so PROC_FLAG and POSITION_STACK are not changed as illustrated in step C of FIG. 8B.

The second "{" causes the procedure begin routine of FIG. 5 to be called which puts 67H 00H 00H in the sixth, seventh, and eighth positions of the PROC_BUFFER and returns NEXT=9, PROC_FLAG=2, and the POSITION_STACK contains 7 as the top entry, and 1 as the bottom entry, as illustrated in step D of FIG. 8B.

Next, "1 add" is encoded using other encoding routines 110 which places 90H 01H 31H in positions 9, 10 and 11 of PROC_BUFFER and NEXT is increased to 12 as illustrated in step E of FIG. 8B.

The first "=}" indicates the end of a routine and procedure end routine 108 illustrated in FIG. 6 is called. 7 is popped from the top of POSITION_STACK and LEN is calculated to be 12−7−2=3. The procedure end routine inserts 00H and 03H in positions 7 and 8 of the PROC_BUFFER. Also, PROC_FLAG is decremented from 2 to 1 as a procedure has been ended. As no new characters have been written into PROC_BUFFER, NEXT remains at 12. These variables are illustrated in step F of FIG. 8B.

The second "}" again calls the procedure end routine of FIG. 6 which pops 1 from POSITION_STACK and puts 00H and 09H in positions 1 and 2 of the PROC_BUFFER. As this brace indicated the end of the first procedure, there are no more nested procedures and PROC_FLAG is decremented to 0. These values are illustrated in step G of FIG. 8B. Next, the NEXT bytes of PROC_BUFFER are appended to the TOKENSEQUENCE_BUFFER as illustrated in step G of FIG. 8A and the process is terminated.

The present invention has been described using one buffer, PROC_BUFFER, to temporarily store the encoded binary routines, one stack, POSITION_STACK, to store the positions where the length information is to be written, and variables NEXT and PROC_FLAG to store the next empty position in PROC_BUFFER and the number of nested routines, respectively. However, it is possible to implement the present invention using a table of buffers or a multiple linked list of buffers.

The process of the present invention can be applied to printer drivers of an operating environment or in a software application. For example, a device driver which implements the present process can be used as part of a printer driver for an operating environment, such as Microsoft Windows ®. A device driver implementing the present invention can also be directly attached to application software, such as WordPerfect ®. In either case, when a driver needs to create SPDL binary output, the current invention will speed up the handling of nested procedures as well as reducing the amount of storage space needed of the file. Further, if the file is to be printed on a network, the transmission time, over the network, for the file is reduced and if the file has to be stored in a buffer before printing, the size of the buffer would also be reduced.

A major advantage of the present invention over the conventional methods of encoding textual nested procedures is that only one buffer is used to temporarily store binary representations of the procedures. The use of one buffer requires for less overhead to keep track of the buffers. When there are many nested procedures, the prior art requires that the system keep track of many non-contiguous storage buffers which can result in a large amount of overhead. An inefficient use of memory also results from the memory allocation required for multiple buffers and from memory fragmentation when using multiple buffers. For example, a certain amount of memory must be reserved for each buffer used. When there are a large number of non-contiguous buffers reserved, few of the buffers will come close to being filled with data, yet sufficient memory must be allocated for each buffer so that none of the buffers overflow. However, the second and third embodiments of the invention do not allocate additional buffers until a previous buffer is full. Therefore, the problem of having multiple unfilled buffers does not exist in any of the embodiments of this invention.

Further, when multiple non-contiguous buffers are used and a buffer which is between two other buffers is no longer necessary as its procedure has been converted, the memory allocated for the buffer is not necessarily usable. By releasing the memory for the buffer, the memory becomes fragmented and therefore, the newly free memory does not necessarily become free for immediate use, as the free area may be too small to store desired information. It is possible to perform a garbage collection procedure to free up the fragmented memory but this is a time consuming procedure and may not result in contiguous space. Therefore, this invention allows a more efficient use of memory and processor time by not having the overhead required to keep track of multiple buffers and not wasting memory caused by fragmentation associated with multiple buffers.

The first embodiment of the invention provides a very efficient method and system for encoding nested routines. However, a drawback of the process of the first embodiment is that a large buffer must be allocated, such as 64 k in size but often the entire buffer will not come close to being filled. Therefore, if the computer system which is encoding nested routines into binary has a relatively small amount of memory, one may not want to allocate 64 k of memory to PROC_BUFFER.

One solution to the problem of using a large PROC_BUFFER is to use a number of smaller sized buffers which are allocated as needed. The use of smaller multiple buffers is somewhat similar to the use of one large memory buffer if the smaller multiple buffers are allocated in a manner which is logically contiguous. This would mean when one of the smaller buffers became full, a second smaller buffer and so on would be appended to the logical end of the buffer. The use of multiple buffers would not have one buffer for each procedure but multiple procedures would be encoded into one buffer until that buffer was full. After the buffer becomes full, an additional buffer is appended to the logical end of the earlier buffer. The buffers do not have to be physically adjacent in memory locations but only have to be considered to follow the logical end of the previous buffer.

Figure 9:
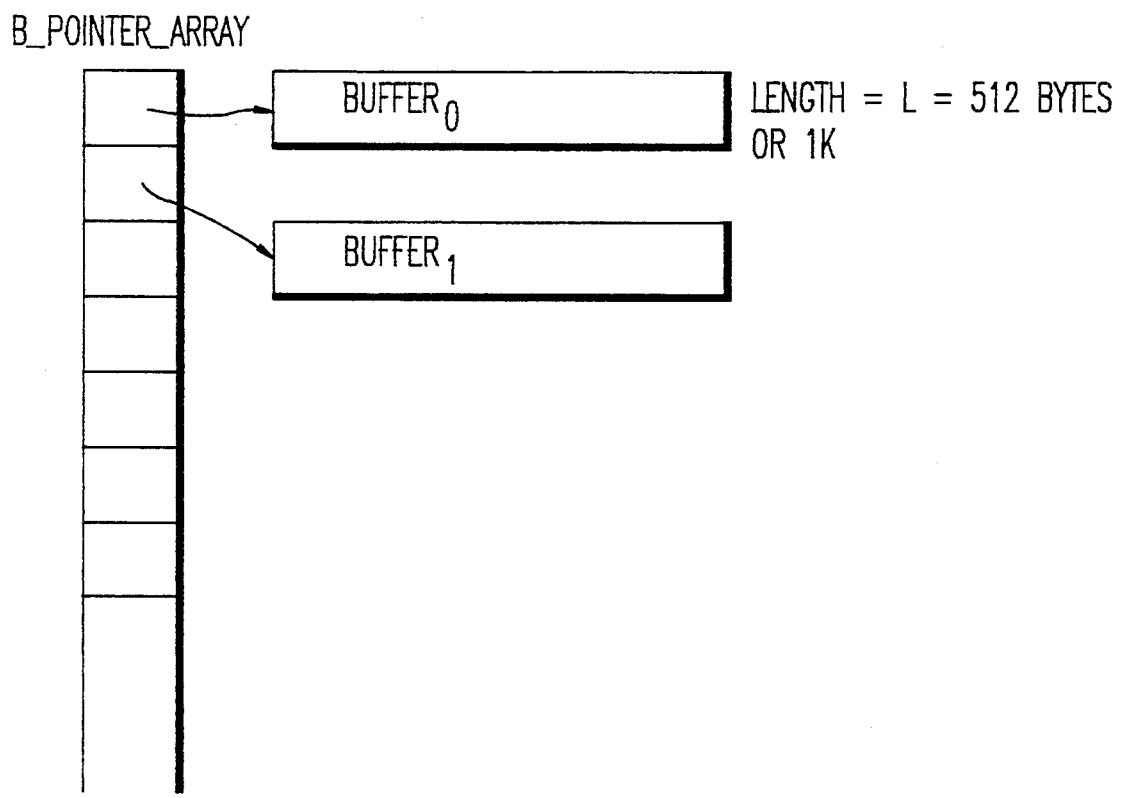
FIG. 9 illustrates multiple buffers and the array index used by the second embodiment of the invention.

FIG. 9 illustrates the memory structures used by the second embodiment of the invention. There is an array B_Pointer_Array which is used to keep track of the multiple logically contiguous buffers. The first entry in the B_Pointer_Array points to the first buffer, buffer$_0$. When buffer$_0$ becomes full, a second entry is placed in the B_Pointer_Array which points to a second buffer, buffer$_1$. Buffers are allocated in this manner as needed. The length of each buffer could be, for example, 512 bytes or 1 k.

Figure 10:
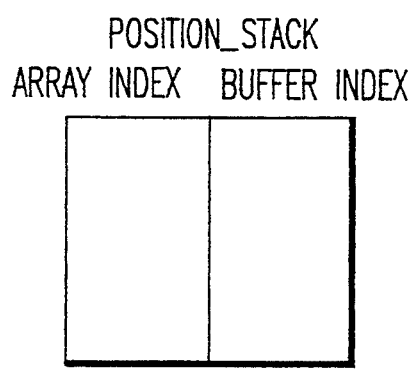
FIG. 10 illustrates the stack structure used to keep track of the reserved length information positions in the buffers of the second embodiment of the invention.

In this embodiment, as in the first embodiment, it is helpful to keep track of where position information is to be written into the buffers. Therefore, instead of keeping track of one variable in a POSITION_STACK as was previously performed by the first embodiment, two variables are stored for the beginning of each procedure; the array index which indicates which buffer is to be written to and the buffer index which indicates the position in the buffer where length information is to be written. This information is kept track of in the POSITION_STACK which is illustrated in FIG. 10.

Figure 11:
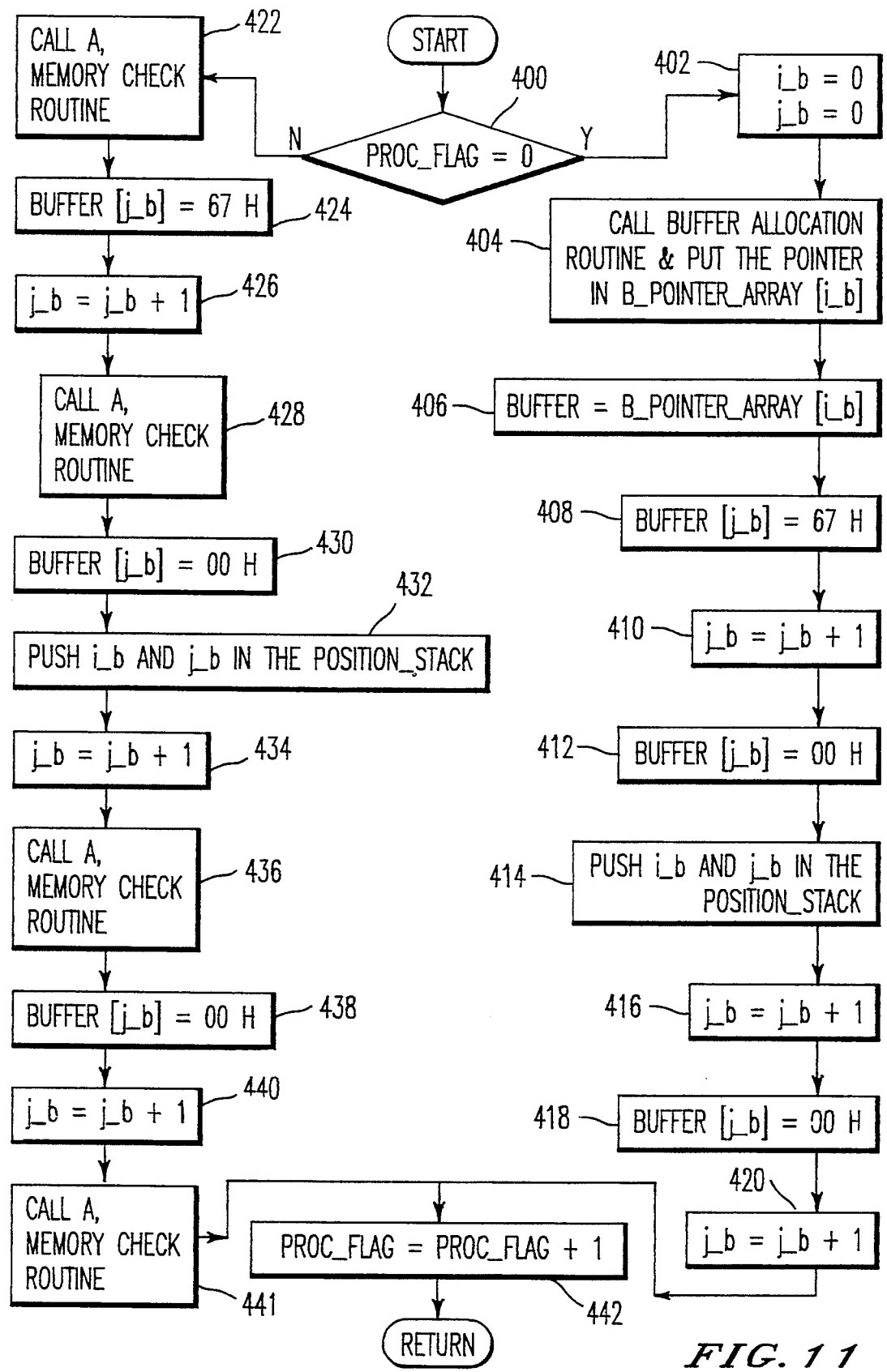
FIG. 11 is a flowchart illustrating the procedure begin routine used by the second embodiment of the invention.

FIG. 11 illustrates the procedure begin routine used by the process of the second embodiment of the invention. When a procedure begins, the process of FIG. 11 is called and the variable PROC_FLAG is examined to see if it is equal to zero in step 400. PROC_FLAG has the same purpose in this embodiment as in the first embodiment; it is used to keep track of the level of the nesting of routines. The process of FIG. 11 will be called when a document is first encoded and therefore, PROC_FLAG will be zero as no procedure has been processed yet. Flow proceeds to step 402 where i_b, the index indicating which buffer is to be used and j_b, the index indicative of the position in the buffer are both set equal to zero.

Step 404 calls the buffer allocation routine. The buffer allocation routine allocates a new buffer of length 512 bytes or 1 k, for example and places a pointer to this buffer in the i_b position of B_Pointer_Array. After the buffer has been allocated in step 404, step 406 indicates that the buffer to be used is the buffer pointed to by the array pointer B_Pointer_Array(i_b), Step 408 sets the j_b position in the buffer equal to 67H, signifying the beginning of a routine. Step 410 increments j_b and step 412 writes 00H in BUFFER(-j_b). As described for the process of the first embodiment of the invention, the 00H is the first byte of length information over which the length information of the routine will eventually be written. As this position reserved for length information is later written over, it is pushed into the position_stack in step 414, although it is not required to be stored as a scanning process or some other method could be used to determine where the position information was reserved. Both the array pointer and buffer index are pushed into the stack.

Step 416 increments the counter j_b and 00H is written into the j_b position in the buffer in step 418, thereby reserving space for the second byte of length information of the routine. Step 420 then increments the counter j_b. Next, flow proceeds to step 442 where the variable PROC_FLAG is incremented by 1 to indicate that there is one procedure currently being processed.

If in step 400, PROC_FLAG is determined to be not equal to zero, the current procedure is not the first procedure being processed and flow proceeds to step 422. In step 422, routine A, illustrated in FIG. 12, is called to determine if the current buffer being used has one more byte available for additional information.

Figure 12:
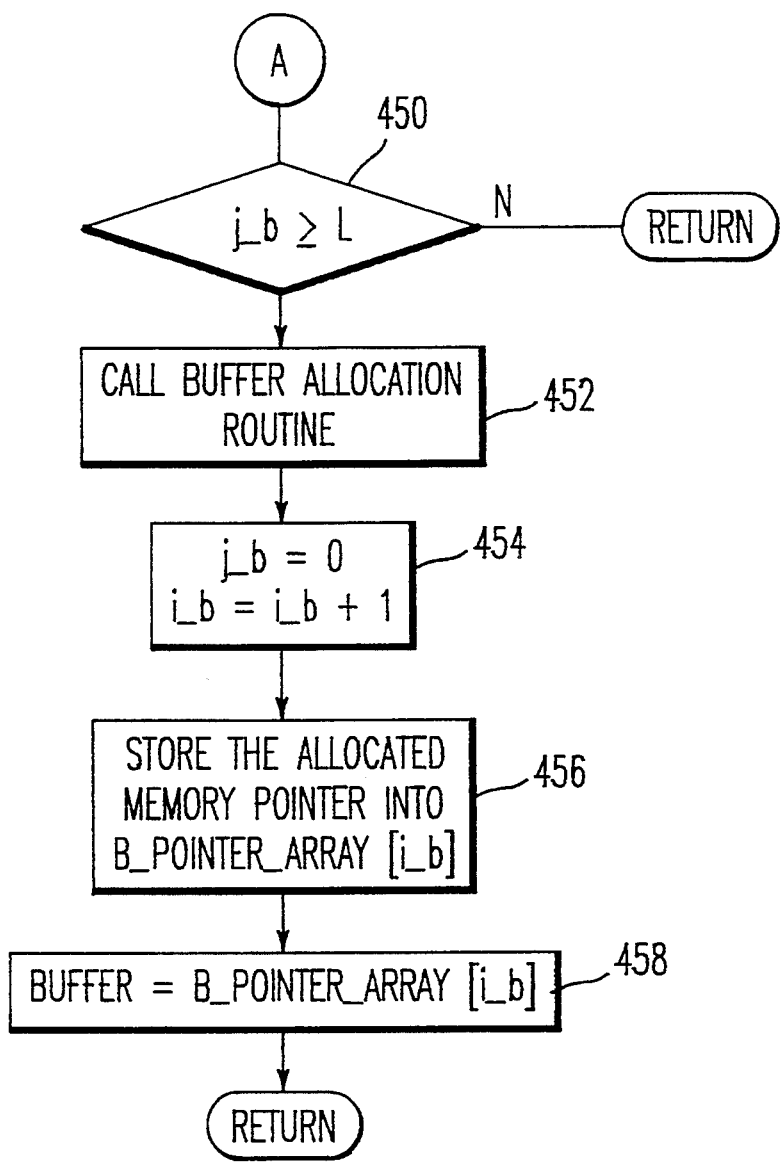
FIG. 12 is an illustration of the memory check routine called by the procedure begin routine of the second embodiment of the invention.

Turning to the memory check routine A illustrated in FIG. 12, step 450 examines the index j_b to determine if it is greater than or equal to L, the length of the buffer which can be 512 bytes or 1 k, for example. If it is greater than or equal to L, the end of the buffer has been reached and a new buffer must be allocated. Step 452 calls the buffer allocation routine which reserves memory for an additional buffer and places a pointer to that buffer in B_Pointer_Array, an example of which is illustrated in FIG. 9. Next, step 454 sets the index of the buffer, j_b equal to zero and increments the index indicating which buffer is to be used, i_b, by 1. Step 456 then stores a pointer to the allocated memory buffer in the i_b position of the B_Pointer_Array. Last, step 458 indicates that the buffer which is to be used is the newly allocated buffer. From step 458, flow returns to the step which called the memory check routine.

Returning to FIG. 11, step 424 sets the j_b position in the buffer equal to 67H. Step 426 increments the index j_b by 1. As another entry is about to be written in the buffer, the buffer must be checked as to whether the end is reached and routine A, the memory check routine is again called in step 428. After flow returns back to the flow chart of FIG. 11 from the memory check routine, step 430 writes 00H into the j_b position of the active buffer. As this position is where length information will eventually be written, the values of the indices i_b and j_b are pushed into the POSITION_STACK.

Next, step 434 increments the index j_b and again the buffer is checked to see if there is enough memory for an additional byte of information and the memory check routine A of FIG. 12 is again called. After flow returns from FIG. 12, step 438 then writes 00H into the j_b position of the buffer, reserving a second byte for position information of the length of the routine. Next, the index j_b is incremented in step 440. Step 441 calls the memory check routine A. However, if the routines which encode a file call the memory check routine A before writing into a buffer, it may not be necessary to call the memory check routine at step 441. At step 442, PROC_FLAG is incremented by 1, indicating there is one more nested procedure.

After flow returns from the procedure begin routine, the routine is then encoded into binary. Before each encoded byte is written into one of the buffers used to store the routines, the memory check routine illustrated in FIG. 12 is called to ensure that the buffer to be written to is not full. If the buffer is full, the memory check routine allocates an additional buffer into which the binary encoded information is then written. If during the processing of the routine, the beginning of a new procedure is encountered, the procedure begin routine of FIG. 11 is called. When the end of a procedure is encountered, the procedure end routine of the process of the second embodiment of the invention illustrated in FIG. 13 is called.

Figure 13:
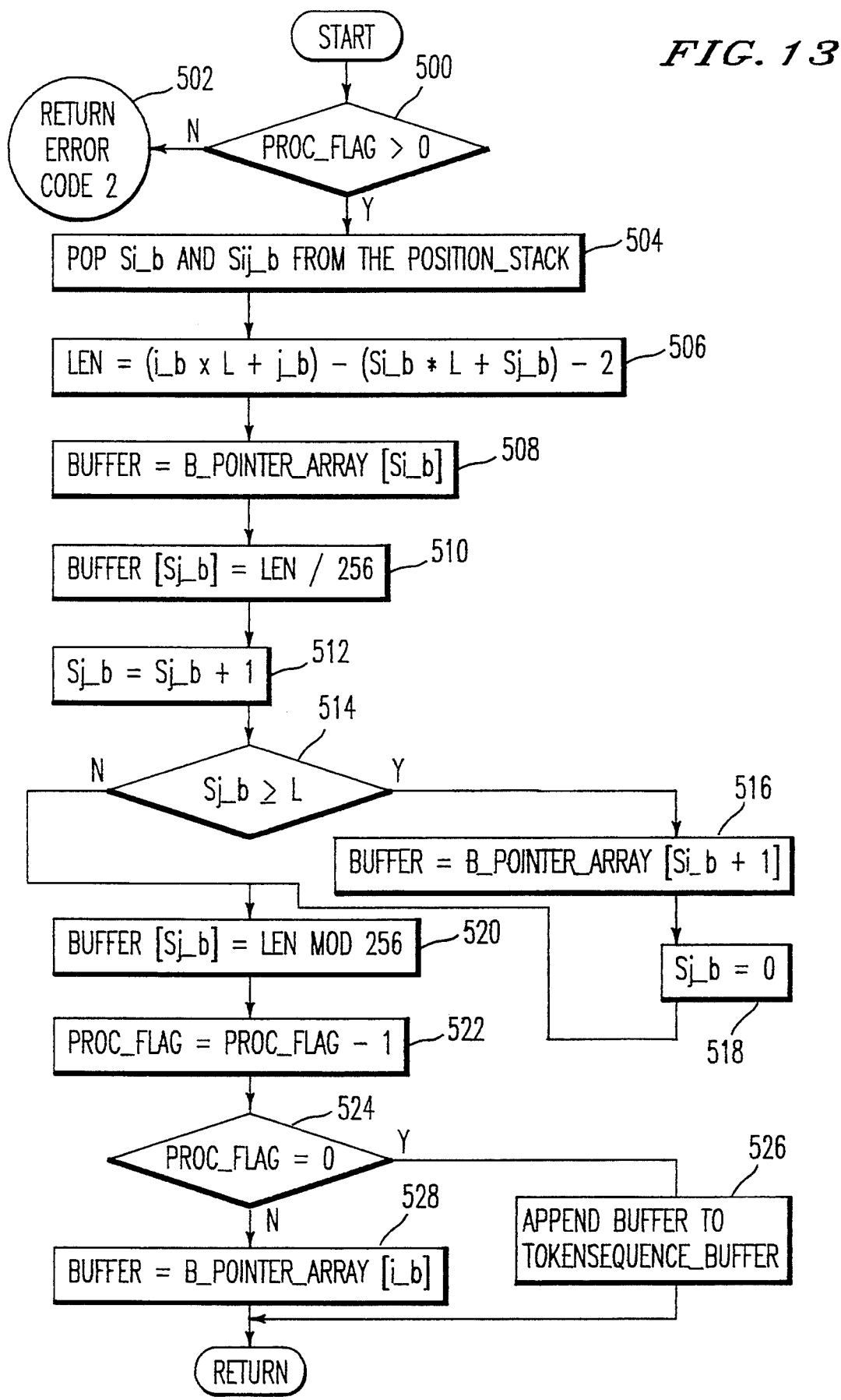
FIG. 13 is a flowchart illustrating the procedure end routine used by the second embodiment of the invention.

In FIG. 13, error checking is performed in step 500 by examining if PROC_FLAG is greater than zero. If PROC_FLAG is not greater than zero, an end of a routine has been encountered without a corresponding beginning. Therefore, step 502 returns error code 2, indicating a procedure end without a corresponding procedure begin.

If PROC_FLAG is greater than zero, flow proceeds to step 504 where the top entry is popped out of the position stack, the array index is written into Si_b and the array position is written into Sj_b. The length of the encoded routine is calculated in step 506. Step 508 sets the active buffer to be the buffer holding the position in which the first byte of length information of the routine is to be written. Step 510 then writes the first byte of length information into the Sj_b position in the buffer. Step 512 increments the index of the buffer position by 1 so that the second byte of length information can be written into the buffer. Step 514 examines the position in the buffer to determine if adding 1 to the buffer index caused the buffer index to be larger than the actual length of the buffer. If the buffer index is greater than the length of the buffer, flow proceeds to step 516 where the buffer being used is incremented by 1 and the position within the next buffer is set equal to zero in step 518.

Step 520 writes the second byte of length information into the Sj_b position of the current buffer. Step 522 then decrements the PROC_FLAG by 1, indicating there is one less nested procedure.

Step 524 examines if PROC_FLAG is equal to zero and if it is, there are no more nested routines and therefore the i_b*L+j_b bytes of the buffers should be appended to the TOKENSEQUENCE_BUFFER in step 526. Step 526 appends the contents of buffer$_0$ to the TOKENSEQUENCE_BUFFER, and if there are buffers subsequent to the buffer$_0$, also appends them to the end of the TOKENSEQUENCE_BUFFER. An example of pseudo code which performs the function of appending the buffers to the TOKENSEQUENCE_BUFFER is:

append B_Pointer_Array[i], i=0    (i_b−1)

buffer=B_Pointer_Array[i_b]

append buffer[j ], j=0    (j_b−1)

The first line of the above pseudo code appends all completely full buffers to the TOKENSEQUENCE_BUFFER. The second line sets the current buffer to the last buffer which is not completely full. The third line appends the contents of the last buffer which is not completely full to the TOKENSEQUENCE_BUFFER without appending any bytes which are after the last byte of information in the buffer.

If step 524 determines that PROC_FLAG is not equal to zero, the first nested routine level has not been reached and information must be continued to be written into the buffers. Step 528 sets the current buffer equal to the last buffer as step 508 previously modified the active buffer so that length information of a procedure could be written. Subsequently, the procedure end routine returns to the main binary encoding routine which called it.

The second embodiment of the invention, illustrated in FIGS. 9–13, illustrates the most efficient embodiment known to the inventor for using multiple logically contiguous memory buffers. However, there is a third embodiment of the invention which also uses logically contiguous memory buffers but uses a double linked list data structure instead of a pointer array to keep track of the logically contiguous memory buffers used in the second embodiment of FIGS. 9-13.

Figure 14:
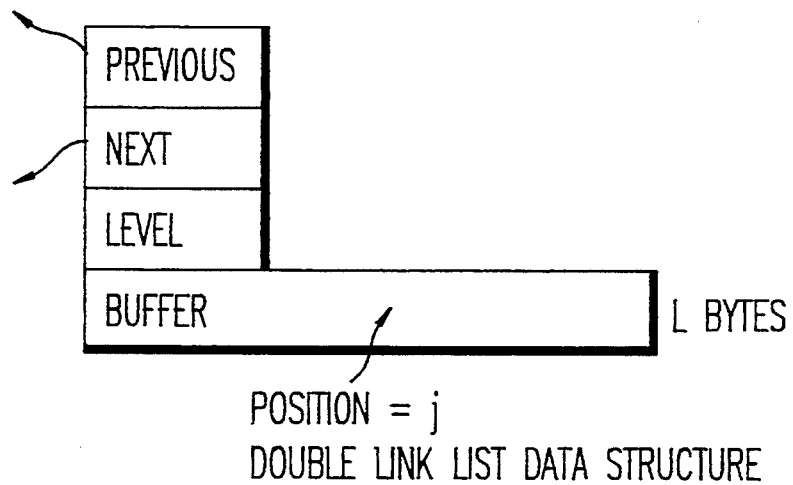
FIG. 14 is an illustration of the double linked list data structure used by the third embodiment of the invention.

FIG. 14 illustrates a double linked list data structure used by the third embodiment of the invention to keep track of the multiple logically contiguous buffers for holding the nested routines. The double linked list data structure has as its first entry a pointer pointing to a previous double linked list data structure. If the double linked list data structure is the first linked list data structure, the pointer to previous points to null. The second entry of the double linked list data structure is a pointer to a next double linked list data structure which contains a buffer which is logically contiguous to the buffer of the double linked list data structure having the pointer to next. Logically contiguous multiple buffers in this context means that multiple buffers can be considered as being one buffer and the end of one of the multiple buffers is followed by another buffer and information which will not fit in the end of one buffer is placed at the beginning of another buffer. If there is no subsequent buffer to be used as the present buffer has not yet been filled, the pointer next points to null. The "level" entry in the double linked list data structure serves to indicate the numbering of the linked list data structures. The first data structure has a level of zero and subsequent data structures have their level incremented by 1. The last entry in the double linked list data structure is the buffer which holds the procedures which are being encoded. The buffer has a length L which can be 512 bytes or 1 k, for example. An index j is used to indicate which position in the buffer is being addressed.

Figure 15:
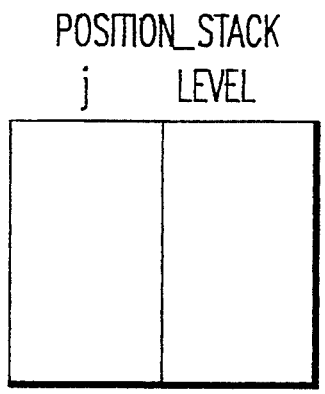
FIG. 15 is an illustration of the stack used to keep track of the reserved positions in the third embodiment of the invention.

Whenever a nested procedure is encountered, it is helpful to store position information where the length of the procedure will be written. The POSITION_STACK, illustrated in FIG. 15 is used to keep track of where position information should be written. The POSITION_STACK has two entries for each nested routine. There is an entry j, corresponding to a position within the buffer where length information is to be written and an entry LEVEL, indicating in which buffer the information should be written.

Figure 16:
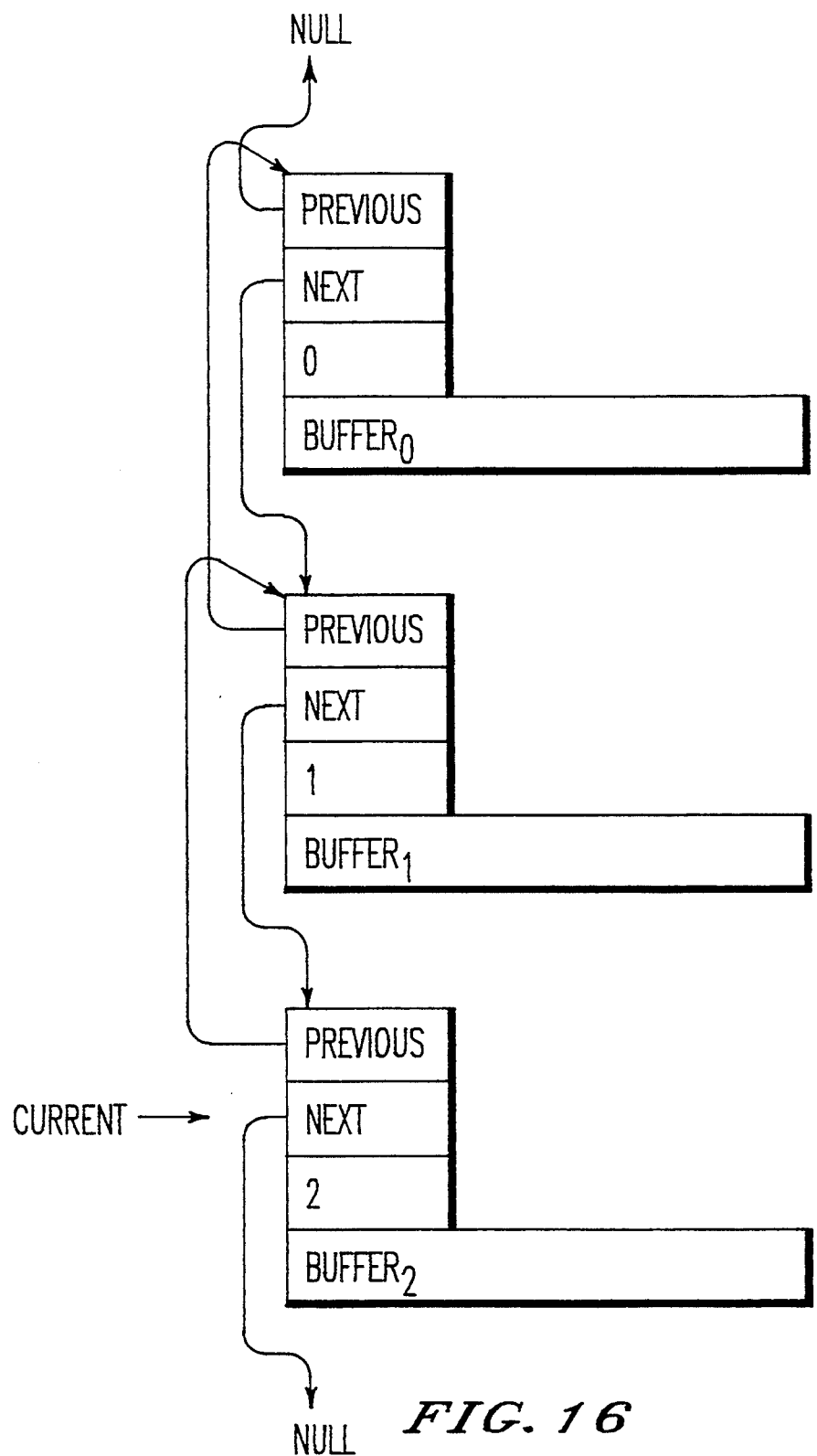
FIG. 16 is an illustration of multiple double linked list data structures used by the third embodiment of the invention.

FIG. 16 illustrates an example of the data structures which would be created when the procedures being encoded require three buffers. The first double link data structure has its level 0, the pointer to previous points to null as there are no previous double linked list data structures, and the pointer to next points to the double linked list data structure below. The double linked list data structure for level 1 is pointed to by next of the double linked list data structure at level 0. The previous pointer of the level 1 linked list data structure points to the level 0 data structure and the next pointer points to the level 2 data structure. The third data structure has 2 as its level, points to the data structure of level 1 by its previous pointer, and its next pointer points to null as there are no subsequent double linked list data structures.

Figure 17:
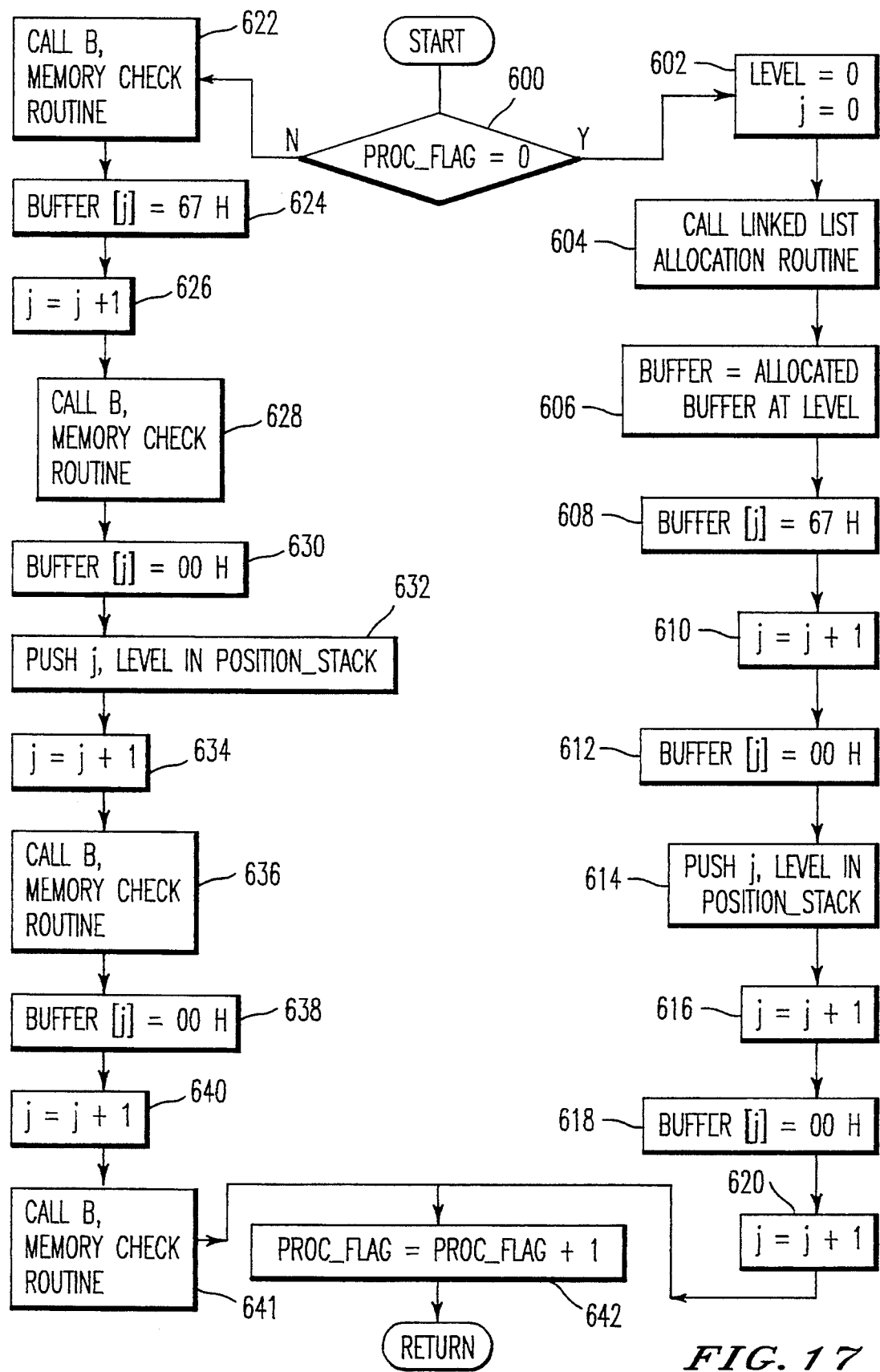
FIG. 17 is a flowchart illustrating the procedure begin routine used by the third embodiment of the invention.

The procedure begin routine of the third embodiment of the invention, illustrated in FIG. 17, is used when the beginning of a procedure is detected. The procedure begin routine of the third embodiment of the invention used with the double linked list data structure is similar to the procedure begin routine illustrated in FIG. 11 which is used for the array/index method of keeping track of the multiple logically contiguous buffers used by the second embodiment.

When the procedure begin routine is called, for example by a main binary encoding routine, step 600 examines whether PROC_FLAG is equal to 0. If PROC_FLAG is equal to 0, flow proceeds to step 602 where the variables LEVEL and j are both set equal to 0. Step 604 calls the linked list allocation routine which creates the first double linked list data structure having the pointers previous and next both pointing to null, the LEVEL equal to 0, the buffer being empty with the buffer position index j=0. Step 606 sets the buffer to be used equal to the allocated buffer at LEVEL, which is 0 when one buffer is being used. Step 608 writes 67H into the first position of the buffer. Step 610 increments the buffer position index j by 1. Step 612 sets the j position in the buffer equal to 00H, reserving memory where length information for the first byte of the routine will be written at a later point in time. Step 614 pushes the values of j and LEVEL into the POSITION_STACK so that position information of where the length information should eventually be written is stored. Step 616 increments the buffer index j by 1 and step 618 reserves another byte in the buffer for the second byte of length information. Step 620 increments the index j by 1 and flow proceeds to step 642 where PROC_FLAG is incremented by 1, indicating that there is a subsequent nested procedure.

Figure 18:
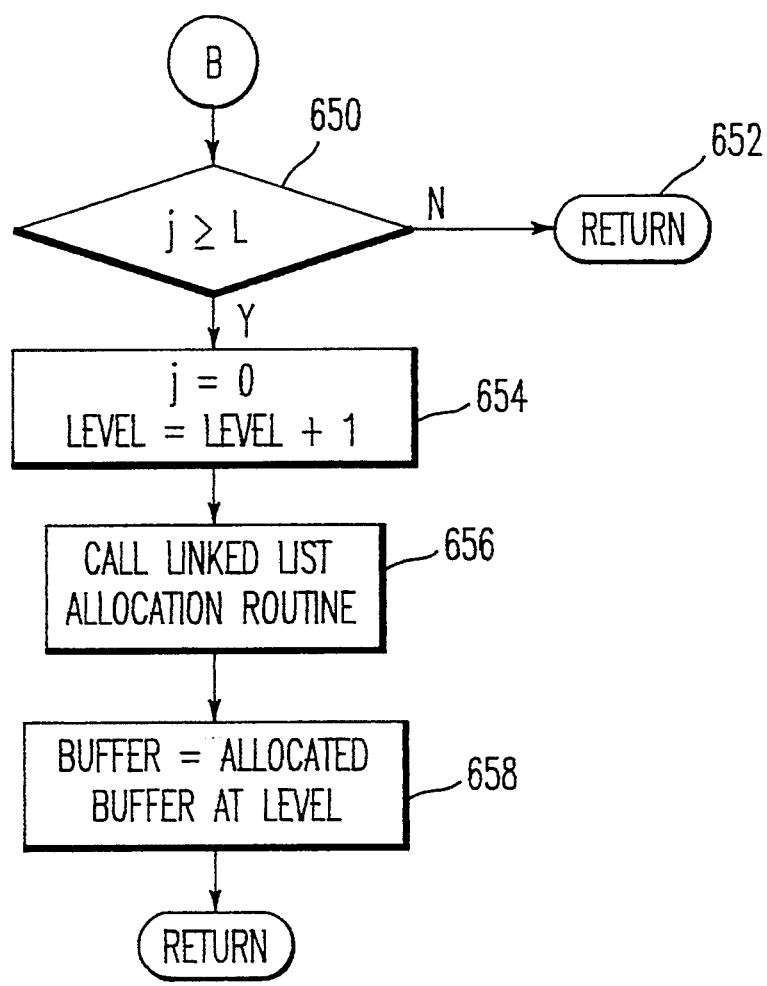
FIG. 18 is the memory check routine used by the procedure begin routine of the third embodiment of the invention.

If step 600 determines that PROC_FLAG is not equal to 1, step 622 calls the memory check routine B illustrated in FIG. 18. The memory check routine of FIG. 18 examines whether there is at least one free byte in the active buffer so that information can be written into the buffer. If step 650 determines that j is less than L, the length of the buffer, indicating there is at least one more byte in the buffer, flow proceeds to step 652 and to the process which called the memory check routine. The length of the buffer L can be 512 bytes or 1 k, for example. If in step 650, the index j is greater than or equal to L, the end of the buffer has been reached and it is necessary to create a new double linked list data structure. Step 654 sets the buffer index j equal to 0 and increments the buffer level by 1. Step 656 then calls a linked list allocation routine which creates a subsequent double linked list data structure. The newly created linked list has its level one greater than the level of the previous double linked list data structure, has its next entry point to null, has its previous entry point to the previous double link data structure. The next entry of the previous double link data structure is changed from pointing to null to pointing to the newly created double linked list data structure. Step 658 then sets the current buffer equal to the buffer of the newly allocated linked list and then flow returns to the procedure which called the memory check routine.

When flow returns to the flow chart of FIG. 17, step 624 sets the j position in buffer equal to 67H. Step 626 then increments j. Step 628 calls the memory check routine B to again determine if there is a free byte in the buffer and if not, allocate a new double linked list data structure. Step 630 then writes 00H in the j position of the buffer, reserving memory for the first length byte of the procedure. Step 632 then writes the buffer position j and LEVEL of the buffer into the position stack so that when the length information is later written, the position in the buffer where the information should be written is stored. As there are two bytes used for length information in this example, j is incremented by 1 in step 634 and again the memory check routine is called in step 636 to make sure there is one more byte remaining in the buffer. Step 638 writes 00H as the second length byte in the buffer and step 640 increments the buffer index j by 1. Flow then proceeds to step 642 where PROC_FLAG is incremented by 1, indicating there is one more nested procedure.

Figure 19:
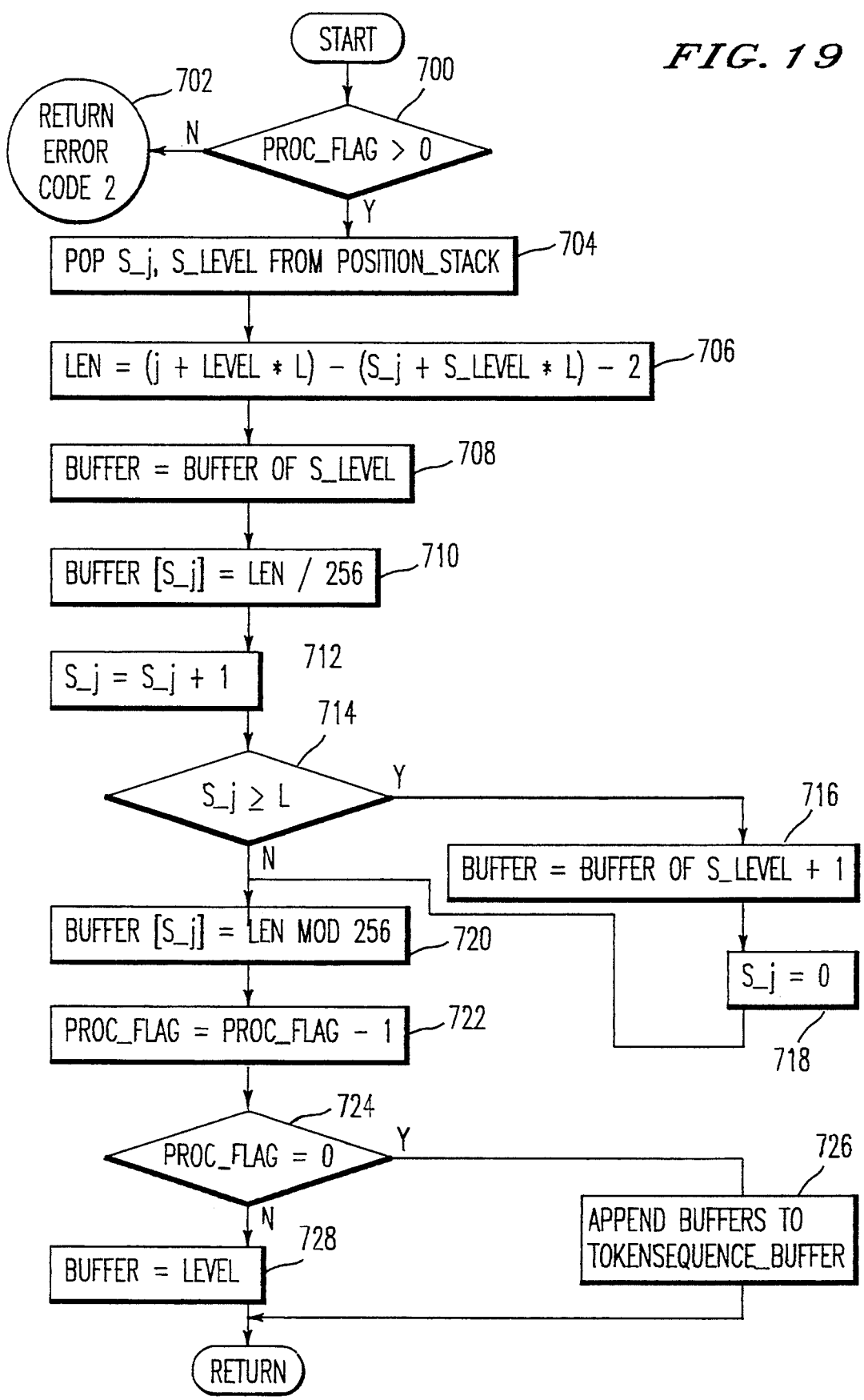
FIG. 19 is a flowchart illustrating the procedure end routine used by the third embodiment of the invention.

As procedures are being encoded into binary after the procedure begin routine has executed, before each byte is written into the buffer, the memory check routine B must be called to ensure that there is one more free byte in the buffer. If it is not, a new buffer and double linked list data structure is allocated.

when the end of a routine is encountered, the procedure end routine for the third embodiment of the invention illustrated in FIG. 19 is called. Step 700 performs error checking to make sure that there is a corresponding beginning to the end of the procedure. If PROC_FLAG is not greater than 0, there is not a matched number of procedure begins and procedure ends and therefore step 702 returns an error code of 2, indicating the unmatched beginning and ends. If PROC_FLAG is greater than 0, flow proceeds to step 704 where information is popped from the POSITIONS_STACK indicating where position information should be written in the buffers. S_j holds the position index within the buffer and S_LEVEL indicates which buffer the position information should be written in.

Step 706 then calculates the length of the procedure and writes it into the variable LEN. Step 708 sets the active buffer to the buffer level which was popped in step 704. Step 710 writes the first byte of length information and then the popped buffer index is incremented in step 712. Step 714 examines the popped buffer index which has been incremented by 1 to determine if it is greater than the length of the current buffer. If it is, the very beginning of the subsequent buffer must be used and flow proceeds to step 716 where the buffer level is incremented. Step 718 then sets the index of the buffer equal to 0. Step 720 writes the second byte of the length information. Step 722 decrements PROC_FLAG indicating there is one less nested routine.

Step 724 examines whether there are any remaining nested routines. If there are not, the (LEVEL*L+j) bytes of content of the buffers are appended to the TOKENSEQUENCE_BUFFER in step 726. As with the second embodiment of the invention, only the buffers which contain encoded routines are appended to the TOKENSEQUENCE_BUFFER which can be, for example, a random access memory or a disk file. The appending is performed in a manner similar to the second embodiment. If step 724 determines that PROC_FLAG is greater than 0 and therefore, there are still nested routines, step 728 resets the buffer back to its previous level before the procedure end routine was encountered. Flow then returns back to the main encoding routine which called the procedure end routine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for encoding a main procedure having at least one nested procedure into a binary representation, comprising the steps of:

encoding the main procedure into a binary format;

reserving, in a storage buffer, memory locations for length information of the binary encoded main procedure;

writing the binary encoded main procedure in the storage buffer;

encoding said at least one nested procedure of the main procedure into a binary format;

reserving, in the storage buffer, memory locations for length information of the binary encoded nested procedure;

writing the binary encoded nested procedure in the storage buffer;

writing a length of the binary encoded nested procedure into the memory locations reserved for the length information of the binary encoded nested procedure; and writing a length of the binary encoded main procedure into the memory locations reserved for the length information of the binary encoded main procedure.

2. A method for encoding a textual representation of nested procedures into a binary representation according to claim 1, further comprising the steps of:

storing the positions of the reserved memory locations for length information of the binary encoded main procedure, after the step of reserving the memory locations for length information of the binary encoded main procedure; and storing the positions of the reserved memory locations for length information of the binary encoded nested procedure, after the step of reserving the memory locations for length information of the binary encoded nested procedure.

3. A method for encoding a textual representation of nested procedures into a binary representation according to claim 2, wherein:

the step of storing the position information of the binary encoded nested procedure and the step of storing the position information of the nested procedure store the respective position information in one stack.

4. A method for encoding a textual representation of nested procedures into a binary representation according to claim 2, further comprising the step of:

storing position information relating to a next available position of the storage buffer whenever memory locations are reserved in the storage buffer; and storing position information relating to a next available position of the storage buffer whenever at least one of the main and nested binary encoded routine are written into the storage buffer.

5. A method for encoding a main procedure having at least one nested procedure into a binary representation according to claim 1 further comprising the step:

checking the storage buffer before each writing or reserving in the storage buffer for a storage buffer full condition and if said storage buffer is determined to be full, allocating an additional memory buffer.

6. A method for encoding a main procedure having at least one nested procedure into a binary representation according to claim 5, further comprising the step of:

creating an array index for each additional memory buffer allocated.

7. A method for encoding a main procedure having at least one nested procedure into a binary representation according to claim 5, further comprising the step:

creating a linked list data structure for each allocated memory buffer.

8. A method for encoding a main procedure having at least one nested procedure into a binary representation according to claim 7, further comprising the step of:
creating, during the step of creating a linked list data structure, a double linked list data structure having a pointer to a previous linked list data structure and a pointer to a next linked list data structure.

9. A method for encoding a main procedure having at least one nested procedure according to claim 1, further comprising the steps of:
initially representing said main procedure and said at least one nested procedure in a clear text format; and
storing the clear text format before the procedures are encoded into binary.

10. A method for encoding a textual representation of nested procedures into a binary representation, comprising the steps of:
reserving memory locations in a memory buffer for length information of a main procedure;
storing position information of the reserved memory locations of the main procedure;
converting a textual representation of the main procedure into a binary representation and writing the binary representation into the memory buffer;
reserving memory locations in the memory buffer for length information of nested procedures within the main procedure;
storing position information of the reserved memory locations of the nested procedure;
converting a textual representation of the nested procedure into a binary representation and writing the binary representation of the nested procedure into the memory buffer;
writing a length of the nested procedure into a position in the memory buffer corresponding to the stored position information of the nested procedure; and
writing a length of the main procedure into a position in the memory buffer corresponding to the stored position information of the main procedure.

11. A method for encoding a textual representation of nested procedures into a binary representation according to claim 10, further comprising the step of:
storing a next available position of the memory buffer whenever memory locations are reserved in the memory buffer; and
storing a next available position of the memory buffer whenever at least one of the main and nested binary encoded procedure are written into the memory buffer.

12. A method for encoding a textual representation of nested procedures into a binary representation according to claim 10, further comprising the steps of:
repeating the steps of reserving memory locations, converting a textual representation of a procedure to a binary representation, and storing the binary representation for each nested procedure within the main procedure when there are a plurality of nested procedures within the main procedure; and
repeating the step of writing a length of the nested procedures for each nested procedure when there are a plurality of nested procedures within the main procedure.

13. A method of encoding a main procedure having at least one nested procedure into a binary representation, comprising the steps of:
encoding the main procedure into a binary format;
reserving, in a storage buffer, memory locations for length information of the binary encoded main procedure;
writing the binary encoded main procedure in the storage buffer after determining there are available memory location in the storage buffer for the binary encoded main procedure and if there are not available memory locations in the storage buffer for the binary encoded main procedure, creating an additional memory buffer having an index and writing portions of the binary encoded main procedure which will not fit into said first storage buffer;
encoding said at least one nested procedure of the main procedure into a binary format;
reserving, in the storage buffer, memory locations for length information of the binary encoded nested procedures if there are available memory locations in said storage buffer and if there are available memory locations, allocating an additional storage buffer having an index;
writing the binary encoded nested procedure in the storage buffer if there are available memory locations for the binary encoded nested procedure in the storage buffer and if there are not available memory locations for the binary encoded nested procedure in the storage buffer, allocating an additional storage buffer having an index and writing a portion of the binary encoded nested procedure into the additional storage buffer if there are not available memory locations in said storage buffer;
writing a length of the binary encoded nested procedure into the memory locations for the length information of the binary encoded nested procedure; and
writing a length of the binary encoded main procedure into the memory locations reserved for the length information of the binary encoded main procedure.

14. An apparatus for encoding nested procedures into a binary representation, comprising:
generating means for generating procedures, said procedures including a main procedure having at least one nested procedure;
means for encoding the generated procedures into a binary format Standard Page Description Language ("SPDL") tokensequence, connected to the generating means;
a logically contiguous memory buffer connected to the means for encoding the generated procedures into a binary format;
means, connected to the logically contiguous memory buffer, for writing a length of the binary representation of the main procedure and said at least one nested procedure into the logically contiguous memory buffer; and
means, connected to the logically contiguous memory buffer, for reserving memory locations within the logically contiguous memory buffer for storing lengths of the binary representations of the main procedure and said at least one nested procedure.

15. An apparatus for encoding nested procedures into a binary representation according to claim 14, further comprising:

a first memory means, connected to the means for reserving memory locations, for storing positions of the reserved memory locations; and a second memory means, connected to the logically contiguous memory buffer, for storing position information relating to a next empty position in the logically contiguous memory buffer.

16. A method for encoding a main procedure having at least one nested procedure into a binary representation, comprising the steps of:

encoding the main procedure into a Standard Page Description Language ("SPDL") binary format tokensequence;

reserving, in a storage buffer, memory locations for length information of the binary encoded main procedure;

writing the binary encoded main procedure in the storage buffer;

encoding said at least one nested procedure of the main procedure into a binary format;

reserving, in the storage buffer, memory locations for length information of the binary encoded nested procedure;

writing the binary encoded nested procedure in the storage buffer;

writing a length of the binary encoded nested procedure into the memory locations reserved for the length information of the binary encoded nested procedure; and writing a length of the binary encoded main procedure into the memory locations reserved for the length information of the binary encoded main procedure.

17. A method for encoding a textual representation of nested procedures into a binary representation according to claim 16, further comprising the steps of:

storing the positions of the reserved memory locations for length information of the binary encoded main procedure, after the step of reserving the memory locations for length information of the binary encoded main procedure; and storing the positions of the reserved memory locations for length information of the binary encoded nested procedure, after the step of reserving the memory locations for length information of the binary encoded nested procedure.

18. An apparatus for encoding a main procedure having at least one nested procedure into a binary representation, comprising:

a storage buffer;

means for encoding the main procedure into a binary format;

means for reserving, in the storage buffer, memory locations for length information of the binary encoded main procedure;

means for writing the binary encoded main procedure in the storage buffer;

means for encoding said at least one nested procedure of the main procedure into a binary format;

means for reserving, in the storage buffer, memory locations for length information of the binary encoded nested procedure;

means for writing the binary encoded nested procedure in the storage buffer;

means for writing a length of the binary encoded nested procedure into the memory locations reserved for the length information of the binary encoded nested procedure; and means for writing a length of the binary encoded main procedure into the memory locations reserved for the length information of the binary encoded main procedure.

19. An apparatus for encoding a textual representation of nested procedures into a binary representation according to claim 18, further comprising:

means for storing the positions of the reserved memory locations for length information of the binary encoded main procedure, after the means for reserving the memory locations for length information of the binary encoded main procedure has reserved the memory locations for length information of the binary encoded main procedure; and means for storing the positions of the reserved memory locations for length information of the binary encoded nested procedure, after the means for reserving the memory locations for length information of the binary encoded nested procedure has reserved the memory locations for length information of the binary encoded nested procedure.

20. An apparatus for encoding a textual representation of nested procedures into a binary representation according to claim 19, wherein:

the storage buffer comprises one stack.

21. An apparatus for encoding a textual representation of nested procedures into a binary representation according to claim 19, further comprising:

means for storing position information relating to a next available position of the storage buffer whenever memory locations are reserved in the storage buffer; and means for storing position information relating to a next available position of the storage buffer whenever at least one of the main and nested binary encoded routine are written into the storage buffer.

22. An apparatus for encoding a main procedure having at least one nested procedure into a binary representation according to claim 18, further comprising:

means for checking the storage buffer before each writing or reserving in the storage buffer for a storage buffer full condition and if said storage buffer is determined to be full, allocating an additional memory buffer.

23. An apparatus for encoding a main procedure having at least one nested procedure into a binary representation according to claim 22, further comprising:

means for creating an array index for each additional memory buffer allocated.

24. An apparatus for encoding a main procedure having at least one nested procedure into a binary representation according to claim 22, wherein:

each of said memory buffers is a linked list data structure.

25. An apparatus for encoding a main procedure having at least one nested procedure into a binary representation according to claim 24, wherein:

each of said linked list data structures is a double linked list data structure having a pointer to a previous linked list data structure and a pointer to a next linked list data structure.

26. An apparatus for encoding a main procedure having at least one nested procedure according to claim 18, further comprising:

means for initially representing said main procedure and said at least one nested procedure in a clear text format; and means for storing the clear text format main procedure, before the procedures are encoded into binary.

27. An apparatus for encoding a textual representation of nested procedures into a binary representation, comprising:

a memory buffer;

means for reserving memory locations in the memory buffer for length information of a main procedure;

means for storing position information of the reserved memory locations of the main procedure;

means for converting a textual representation of the main procedure into a binary representation and writing the binary representation into the memory buffer;

means for reserving memory locations in the memory buffer for length information of nested procedures within the main procedure;

means for storing position information of the reserved memory locations of the nested procedure;

means for converting a textual representation of the nested procedure into a binary representation and writing the binary representation of the nested procedure into the memory buffer;

means for writing a length of the nested procedure into a position in the memory buffer corresponding to the stored position information of the nested procedure; and means for writing a length of the main procedure into a position in the memory buffer corresponding to the stored position information of the main procedure.

28. An apparatus for encoding a textual representation of nested procedures into a binary representation according to claim 27, further comprising:

means for storing a next available position of the memory buffer whenever memory locations are reserved in the memory buffer; and means for storing a next available position of the memory buffer whenever at least one of the main and nested binary encoded procedure are written into the memory buffer.

* * * * *